(12) United States Patent
Navon et al.

(10) Patent No.: US 11,340,810 B2
(45) Date of Patent: May 24, 2022

(54) OPTIMIZING DATA STORAGE DEVICE OPERATION BY GROUPING LOGICAL BLOCK ADDRESSES AND/OR PHYSICAL BLOCK ADDRESSES USING HINTS

(71) Applicant: Western Digital Technologies, Inc., San Jose, CA (US)

(72) Inventors: Ariel Navon, Revava (IL); Alexander Bazarsky, Holon (IL); Judah Gamliel Hahn, Ofra (IL); Karin Inbar, Ramat-Hasharon (IL); Rami Rom, Zichron-Yacov (IL); Idan Alrod, Herzeliya (IL); Eran Sharon, Rishon Lezion (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 333 days.

(21) Appl. No.: 16/450,618

(22) Filed: Jun. 24, 2019

(65) Prior Publication Data

US 2020/0110536 A1 Apr. 9, 2020

Related U.S. Application Data

(60) Provisional application No. 62/743,433, filed on Oct. 9, 2018.

(51) Int. Cl.
*G06F 3/06* (2006.01)
*G06N 20/00* (2019.01)
*G06N 3/02* (2006.01)

(52) U.S. Cl.
CPC ............ *G06F 3/064* (2013.01); *G06F 3/0616* (2013.01); *G06F 3/0673* (2013.01); *G06N 3/02* (2013.01); *G06N 20/00* (2019.01)

(58) Field of Classification Search
CPC ...... G06F 3/064; G06F 3/0616; G06F 3/0673; G06N 20/00; G06N 3/02
See application file for complete search history.

(56) References Cited

U.S. PATENT DOCUMENTS 5,890,211 A 3/1999 Sokolov et al.
6,092,154 A 7/2000 Curtis et al.
(Continued)

OTHER PUBLICATIONS

Trautman et al., "Scalability and Performance in Modern File Systems"; accessed Jun. 24, 2019; 10 pages; http://www.siliconbunny.com/downloads/xfs_white_paper.html.
(Continued)

*Primary Examiner* — Charles Rones
*Assistant Examiner* — Han V Doan
(74) *Attorney, Agent, or Firm* — Loza & Loza, LLP; Gabriel Fitch

(57) ABSTRACT

Methods and apparatus for managing and optimizing data storage devices that include non-volatile memory (NVM) are described. One such method involves deriving a hint for one or more logical block addresses (LBAs) of a storage device based on information received from a host device and/or physical characteristics of the storage device, such as LBAs that are invalidated together; grouping the LBAs into one or more clusters of LBAs based on the derived hint and a statistical analysis of the physical characteristics of the storage devices; allocating available physical block addresses (PBAs) in the storage device to one of the LBAs based on the one or more clusters of LBAs to achieve optimization of a data storage device.

16 Claims, 12 Drawing Sheets

(56) References Cited

U.S. PATENT DOCUMENTS

| | | |
|---|---|---|
| 7,743,038 B1 | 6/2010 | Goldick |
| 7,937,393 B2 | 5/2011 | Prahlad et al. |
| 8,275,946 B1 | 9/2012 | Smith |
| 8,775,741 B1 | 7/2014 | De La Iglesia |
| 2003/0188184 A1 | 10/2003 | Strongin et al. |
| 2006/0106984 A1 | 5/2006 | Bartley et al. |
| 2006/0179236 A1 | 8/2006 | Shafi |
| 2007/0266037 A1 | 11/2007 | Terry et al. |
| 2008/0320211 A1 | 12/2008 | Kinoshita |
| 2009/0031083 A1 | 1/2009 | Willis et al. |
| 2009/0228875 A1 | 9/2009 | Devries |
| 2010/0262721 A1 | 10/2010 | Asnaashari et al. |
| 2011/0296088 A1 | 12/2011 | Duzly et al. |
| 2011/0320685 A1 | 12/2011 | Gorobets et al. |
| 2012/0017045 A1* | 1/2012 | Haines ............... G06F 12/0802 711/118 |
| 2012/0051137 A1 | 3/2012 | Hung et al. |
| 2012/0144092 A1 | 6/2012 | Hsieh et al. |
| 2012/0284587 A1 | 11/2012 | Yu et al. |
| 2012/0290768 A1* | 11/2012 | Rubowitz ............... G06F 3/067 711/103 |
| 2012/0317335 A1 | 12/2012 | Cho |
| 2013/0024609 A1 | 1/2013 | Gorobets et al. |
| 2013/0080732 A1 | 3/2013 | Nellans et al. |
| 2013/0086311 A1 | 4/2013 | Huang et al. |
| 2013/0138867 A1 | 5/2013 | Craft et al. |
| 2013/0191349 A1 | 7/2013 | Akirav et al. |
| 2013/0262533 A1 | 10/2013 | Mitra et al. |
| 2013/0262736 A1 | 10/2013 | Kegel et al. |
| 2013/0275672 A1 | 10/2013 | Bert |
| 2013/0297852 A1 | 11/2013 | Fai et al. |
| 2014/0082324 A1 | 3/2014 | Elhamias et al. |
| 2014/0149641 A1 | 5/2014 | Avila et al. |
| 2014/0289492 A1* | 9/2014 | Ranjith Reddy ....... G06F 3/064 711/170 |
| 2014/0337560 A1 | 11/2014 | Chun et al. |
| 2015/0178010 A1* | 6/2015 | Chang ................. G06F 3/0644 711/170 |
| 2015/0178190 A1* | 6/2015 | Fisher ..................... G06F 12/08 711/103 |
| 2015/0199269 A1 | 7/2015 | Bert et al. |
| 2015/0356020 A1 | 12/2015 | Desai et al. |
| 2016/0026406 A1 | 1/2016 | Hahn et al. |
| 2016/0054931 A1 | 2/2016 | Romanovsky et al. |
| 2016/0054934 A1 | 2/2016 | Hahn et al. |
| 2016/0246726 A1* | 8/2016 | Hahn .................... G06F 3/0679 |
| 2017/0277472 A1* | 9/2017 | Huang ................ G06F 11/1471 |
| 2019/0066021 A1* | 2/2019 | Tang .................... G06K 9/6234 |

OTHER PUBLICATIONS

Miller, Barton P., "CS 537 Notes, Section #26: Windows (NT) File System"; accessed Jun. 24, 2019; 5 pages; http://pages cs.wisc.edu/~bart/537/lecturenotes/s26 html.

Hahn, et al., Office Action dated Dec. 14, 2017 for U.S. Appl. No. 15/050,364.

Romanovsky, et al., Office Action dated Aug. 9, 2017 for U.S. Appl. No. 14/555,548.

Hahn, Judah G. et al., Non-Final Office Action dated May 10, 2017 for U.S. Appl. No. 15/050,364.

Romanovsky, et al., Final Office Action dated Jan. 25, 2017 for U.S. Appl. No. 14/555,548.

Notice of Allowance and Fees Due for U.S. Appl. No. 14/297,563 (dated Jul. 25, 2016).

Non-Final Office Action for U.S. Appl. No. 14/555,548 (dated Jul. 5, 2016).

"NVM Express," Specification Revision 1.2.1, http://nvmexpress.org/wpcontent/uploads/NVM_Express_1_2_1_Gold_20160603.pdf, pp. 1-217 (Jun. 5, 2016).

Final Office Action for U.S. Appl. No. 14/297,563 (dated Apr. 13, 2016).

Non-Final Office Action for U.S. Appl. No. 14/814,460 (dated Mar. 28, 2016).

Prabhakaran et al., "Analysis and Evolution of Journaling File Systems," 2005 USENIX Annual Technical Conference, pp. 105-120 (2005).

Commonly-Assigned, co-pending U.S. Appl. No. 14/977,559 for "Methods, Systems, and Computer Readable Media for Automatically and Selectively Enabling Burst Mode Operation in a Storage Device" (Unpublished, filed Dec. 21, 2015).

Non-Final Office Action for U.S. Appl. No. 14/297,563 (dated Dec. 4, 2015).

"NVM Express Overview," NVM Express, pp. 1-2 (copyright 2013).

"Understanding the Flash Translation Layer (FTL) Specification," AP-684 Application Note, Intel, pp. 1-20 (Dec. 1998).

"Ext4 Disk Layout," https://ext4.wiki.kernel.org/index.php/Ext4_Disk_Layout, Wikipedia, pp. 1-28 (Nov. 17, 2014).

"CreateFile function," Microsoft, Windows Dev Center, https://msdn.microsoft.com/enus/library/windows/desktop/aa363858(v=vs 85).aspx, pp. 1-20 (2008).

"NVM Express," Specification Revision 1.2, http://nvmexpress.org/wpcontent/uploads/NVM_Express_1_2_Gold_20141209.pdf, pp. 1-205 (Nov. 3, 2014).

"I/O Limits: block sizes, alignment and I/O hints," Red Hat, http://people.redhat.com/msnitzer/docs/io-limits.txt, pp. 1-4, (Jan. 14, 2013).

Commonly-Assigned, co-pending U.S. Appl. No. 14/555,548 for "Storage Devices and Methods for Optimizing Use of Storage Devices Based on Storage Device Parsing of File System Metadata in Host Write Dperations," (Unpublished, filed Nov. 26, 2014).

Hahn, et al., Office Action dated Aug. 25, 2017 for U.S. Appl. No. 14/464,584.

Non-Final Office Action for U.S. Appl. No. 14/464,584 (dated Nov. 18, 2016).

Notice of Allowance and Fees Due for U.S. Appl. No. 14/814,460 (dated Sep. 23, 2016).

Final Office Action for U.S. Appl. No. 14/464,584 (dated Apr. 26, 2016).

Non-Final Office Action for U.S. Appl. No. 14/464,584 (dated Dec. 4, 2015).

"NVM Express: Revision 1.3a," https://nvmexpress.org/wp-content/uploads/NVM-Express-1_3a-20171024_ratified.pdf (Oct. 24, 2017).

* cited by examiner

| LBA Range | LBA Type-Metadata | PEC | Read Parameters [*4] | Read Frequency | Code Rate | Temperature [Celsius] |
|---|---|---|---|---|---|---|
| 0-100 | FTL | 45 | def;def;def;def | 1 per month | 0.80 | 25 |
| 100-200 | Excel | 60 | +1;+3;+3;+5 | 2 per week | 0.84 | 40 |
| 200-250 | JPEG | 51 | +1;+5;+7;+11 | 7 per week | 0.9 | 77 |
|  |  |  |  |  |  |  |
|  |  |  |  |  |  |  |
|  |  |  |  |  |  |  |

800 — 802 (LBA Range), 804 (LBA Type-Metadata), 806 (PEC), 808 (Read Parameters), 810 (Read Frequency), 812 (Code Rate), 814 (Temperature)

OPTIMIZING DATA STORAGE DEVICE OPERATION BY GROUPING LOGICAL BLOCK ADDRESSES AND/OR PHYSICAL BLOCK ADDRESSES USING HINTS

CROSS-REFERENCE TO RELATED APPLICATION(S)

This application which claims priority to and the benefit of U.S. Provisional Application No. 62/743,433, filed on Oct. 9, 2018, "LOGICAL BLOCK ADDRESS AND PHYSICAL BLOCK ADDRESS CLUSTERING IN FLASH TRANSLATION LAYER USING DERIVED HINTS", the entire content of which is incorporated herein by reference.

FIELD

The subject matter described herein generally relates to data storage device optimization. More particularly, the subject matter described herein relates to methods and apparatus for optimizing data storage device operations by grouping logical block addresses (LBAs) and/or physical block addresses (PBAs) according to derived hints.

INTRODUCTION

In a variety of consumer electronics, solid state devices (SSDs) incorporating non-volatile memories (NVMs) are frequently replacing or supplementing conventional rotating hard disk drives for mass storage. These NVMs may include one or more flash memory devices, such as NAND flash memories, and the flash memory devices may be logically divided into blocks with each of the blocks further divided into logically addressable pages.

A protocol stack through which a host, such as a host computer, accesses such storage devices, may be referred to as the host storage stack, or as the file system driver. The host storage stack includes a number of layers that may be used to represent the storage device. These layers include caching layers, memory-mapped buffers, and file systems, which allow an application to store data in files rather than managing the actual block device interface.

Additionally, it is noted that it is difficult for a storage device or determine the ideal access pattern desired by the host. In the case of flash storage devices, in particular, a device can adjust its storage strategy if the storage device has information in advance of what the host's read pattern would be for certain logical block address (LBA) sequences. As an example, if the device has information that a certain LBA range will be read sequentially at boot, it may make that range available for access before it completes internal initialization. As another example, if the device has information that that a certain LBA sequence will only hold temporary files with a lifetime of one host power cycle, it may choose particular flash regions that are tuned for lower retention or keep data destined for these LBAs in random access memory (RAM).

Storage protocols such as hybrid serial advanced technology attachment (SATA) and non-volatile memory express (NVMe) include the ability for the host to create "hints", which advise the device of characteristics of specific LBA ranges. These hints do not require the device to change its behavior, but optionally allow for optimization of specific ranges. Sending hints effectively requires the cooperation of multiple parts of the storage stack since the metadata used to determine a hint is enmeshed within the file system. Additionally, although known operating systems may send hints on a limited basis, such hints are also not the most effective for solid state drive optimization.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a data storage device comprising: a hint derivation circuit configured to derive a hint for one or more logical block addresses (LBAs) of the data storage device based on information received from a host device and/or a plurality of physical characteristics of the data storage device; a machine learning circuit configured to group the one or more LBAs into one or more clusters of LBAs based on the derived hint and a machine learning process based on the plurality of physical characteristics of the data storage device; and a flash translation layer (FTL) circuit configured to allocate available physical block addresses (PBAs) in the data storage device to the one or more LBAs based on the one or more clusters of LBAs.

Another embodiment of the disclosure provides a data storage device comprising: an interface circuit configured to receive read and write requests in the data storage device from a host device; and controller circuitry configured to derive a hint from the received write requests in the interface circuit for one or more logical block addresses (LBAs) of the data storage device based on information received from a host device and/or a plurality of physical characteristics of the data storage device; and cluster the one or more LBAs together into at least one LBA cluster based on the derived hint and a statistical analysis of the plurality of physical characteristics of the data storage device.

Yet another embodiment of the disclosure provides a method comprising: deriving a hint for one or more of logical block addresses (LBAs) of a non-volatile memory (NVM) storage device, based on information received from a host device and/or a plurality of physical characteristics of the NVM storage device; grouping the one or more LBAs into one or more clusters based on the derived hint and a statistical analysis of the plurality of physical characteristics of the NVM storage device; and allocating available physical block addresses (PBAs) in the NVM storage device to the one or more LBAs based on the one or more clusters of LBAs.

Yet another embodiment of the disclosure provides a data storage device comprising: means for determining one or more hints for one or more of logical block addresses (LBAs) in the data storage device based on information received from a host device and/or a plurality of physical characteristics of the data storage device, wherein the one or more hints include a hint that a plurality of the one or more of the LBAs have been either invalidated or relocated together; means for clustering the one or more LBAs into one or more clusters of LBAs based on the hint and a dimension reduction analysis of one or more physical characteristics of the storage device; and means for assigning available physical block addresses (PBAs) in the data storage device to at least one of the one or more LBAs based on the clusters of LBAs.

Yet another embodiment of the disclosure provides a system comprising: a host device; and a data storage device communicatively coupled the host device, the data storage device comprising: a non-volatile memory (NVM); and a controller configured to derive a hint from a received write command from the host device, wherein the derived hint is based on a determination that one or more logical block addresses (LBAs) of the write command refer to a common user file in the data storage device; and cluster the one or more LBAs together into one or more LBA clusters based on the derived hint and a statistical analysis of a plurality of physical characteristics of the NVM.

BRIEF DESCRIPTION OF THE DRAWINGS

FIG. 8 illustrates an example of a table showing a dataset of the input features or characteristics that may be monitored and recorded for or as part of the principal component analysis (PCA).

DETAILED DESCRIPTION

The subject matter described herein includes methods, systems, and computer readable media for deriving hints using machine learning in order to optimize memory management operations in a data storage device, such as a solid state device. The hint derivations are used to perform various memory management operations such as block allocations and relocations, as examples. In one aspect, the hint derivations can be used to group logical block addresses (LBAs). In such case, available physical blocks addresses (PBAs) can be assigned to the LBAs based on the grouping. As a result, the data storage devices described herein can perform optimized management operations such as block allocations and relocations.

Exemplary Data Storage Devices

Figure 1:
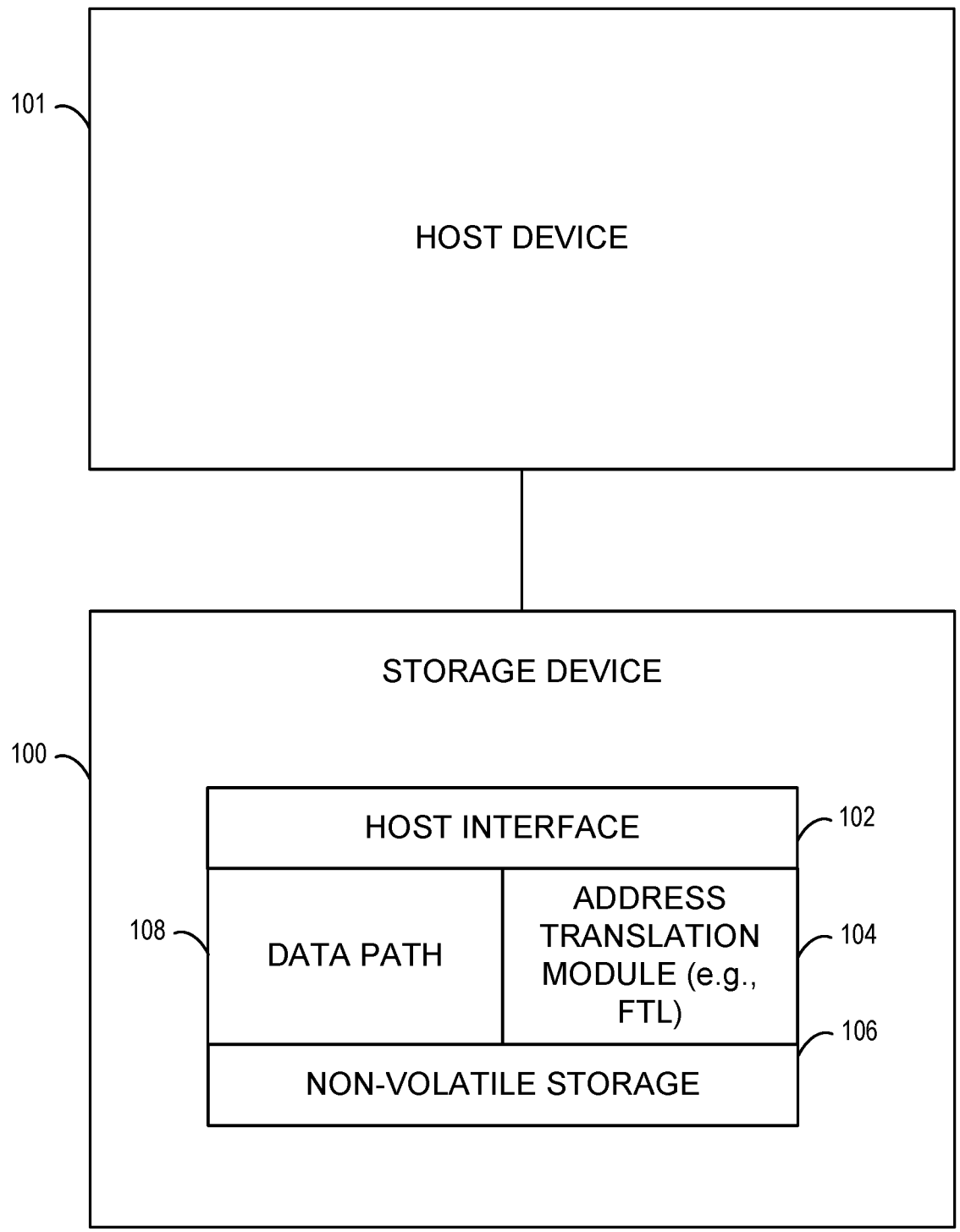
FIG. 1 is a block diagram illustrating an exemplary operating environment for the subject matter described herein.

FIG. 1 is a block diagram of an exemplary operating environment in which the hint derivation and storage device utilization optimization methods described herein may be used. Referring to FIG. 1, a storage device 100 provides non-volatile storage for a host device 101. Storage device 100 may be any suitable device that incorporates non-volatile memory and that allows access to that memory by a host device. In one example, storage device 100 may be a NAND flash device. However, other storage devices may also be used within the scope of the subject matter described herein. For example, storage device 100 may be a NOR flash device, a solid state drive that incorporates NOR and/or NAND flash memory, or a device that combines solid state storage with disk storage.

Storage device 100 may include hardware, software, and firmware components. For example, storage device 100 typically includes a storage controller that controls access by host device 101 to non-volatile memory storage. The storage controller may comprise any number of processing circuitry within the storage device 100, including one or more of host interface 102, flash translation layer 104, and a non-volatile memory interface (not shown in FIG. 1), combinations thereof, and including components in forward and backend portions of the storage device 100. As described above, storage device 100 may also include hardware or firmware components that implement hint derivation and storage device utilization optimization as described herein. These components will be described in more detail below.

In the illustrated example, storage device 100 includes a host interface 102 for interfacing with host device 101. Host interface 102 may be any suitable interface for handling I/O operations (e.g., write/read operations) between host device 101 and non-volatile memory. For example, host interface 102 may be a SATA interface, a peripheral component interface express (PCIe) interface, NVMe, or any other suitable interface for receiving I/O commands from a host system. An address translation module 104 (or, in another example, a flash translation layer (FTL) circuit or logic) translates from the address space used by the host to the address space used by storage device 100 to access non-volatile storage 106. In one example, host device 101 may use logical addressing by specifying logical block addresses (LBAs) in I/O operations to storage device 100, storage device 100 may use physical addressing to specify memory locations, and address translation module or FTL circuit 104 may translate between the logical address space and the physical address space.

Non-volatile storage 106 may comprise the physical memory cells where data is stored. For example, in the case of flash memory, non-volatile storage 106 may include NAND or NOR flash memory cells in two-dimensional, three-dimensional, or combinations of two-dimensional and three-dimensional configurations. As stated above, non-volatile storage 106 may also include one or more disk storage devices. Storage device 100 further includes a data path 108 that communicates data from host device 101 to non-volatile storage 106 and from non-volatile storage 106 to the host. Data path 108 may include data buffers and error detection and correction modules for ensuring data integrity.

In addition, as will be described in detail below, data path 108 may also include hint derivation and memory utilization optimization.

Figure 2:
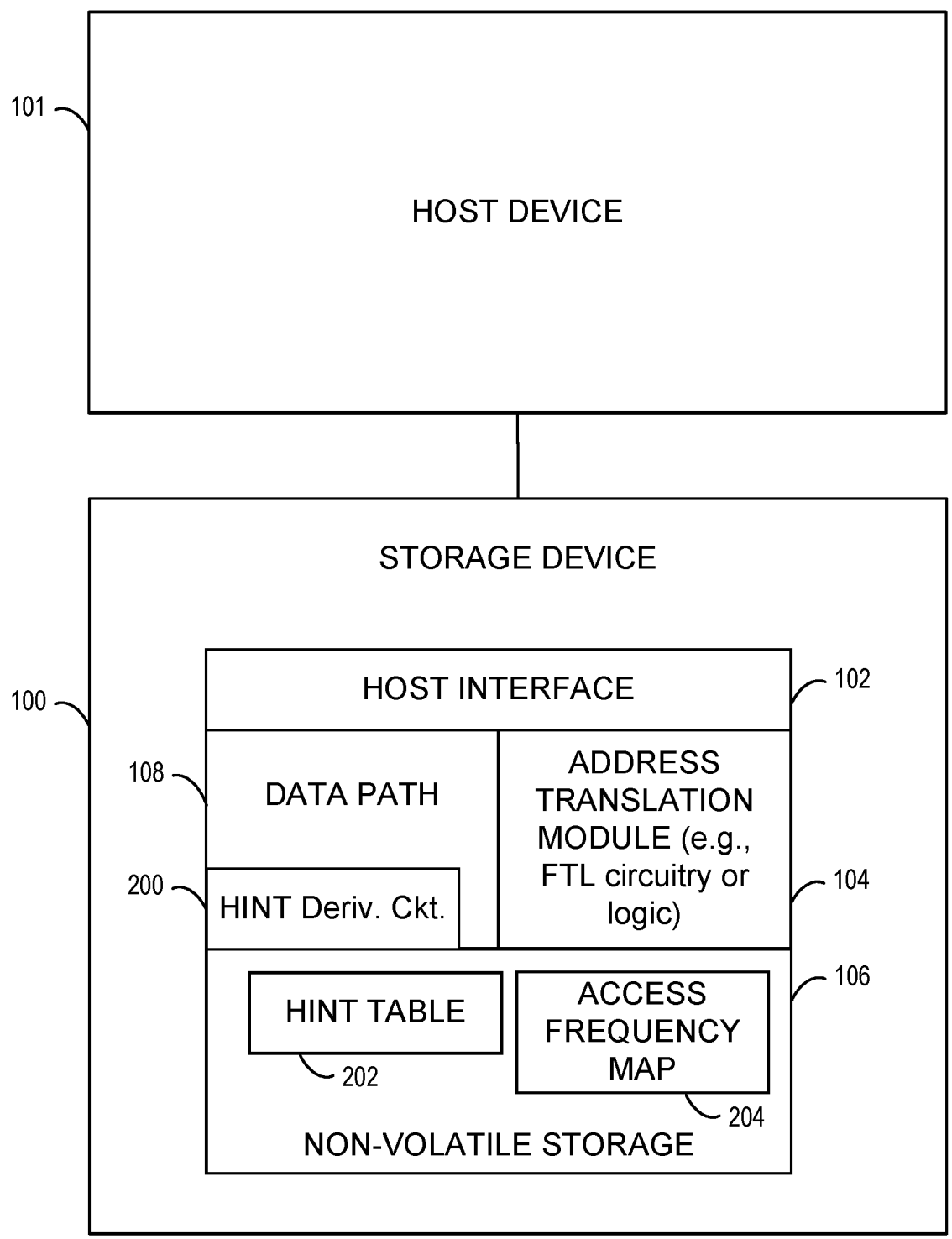
FIG. 2 is a block diagram of exemplary components of a storage device with a hint derivation module, hint tables, and an access frequency map according to aspects of the subject matter described herein.

FIG. 2 is a block diagram of storage device 100 and host device 101 in FIG. 1 where storage device 100 includes a hint derivation module or circuit 200 for deriving hints from accesses to storage device and from file system metadata and utilizing the hints to optimize utilization of non-volatile storage 106. As used herein, a hint refers various characteristics of specific LBA ranges that may be of interest to the storage device. Furthermore, as used herein, hint derivation module or circuit 200 refers to hardware, firmware, software, logic circuitry, or combinations configured to derive hints from incoming data from the host device 101. In FIG. 2, hint derivation module 200 may comprise a hardware or firmware component of storage device 100 that resides on the storage device side of host interface 102 and analyzes incoming data for patterns. Hint derivation module 200 may also detect the access frequency for LBAs in I/O requests from host device 101. Hint derivation module 200 may also derive hints from file system metadata. Hint derivation module 200 may use the hints to optimize utilization of the non-volatile memory 106. In further aspects, the hint derivation module or circuit 200 may be used to derive one or more hints that one or more logical block addresses (LBAs) refer to a common user file on the storage device based on one or more characteristics of the storage device. Examples of optimizations that may be performed will be described below.

A hint table 202 stores LBA ranges and corresponding hints that indicate how the corresponding LBA range will likely be accessed by the host system in the future. In one example, the hints may be file types, which provide an indication of how the files will subsequently be accessed by the host system. Access frequency map 204 stores LBA ranges and frequencies of access for the ranges. Access frequency map 204 may be in the form of statistics, counters, logs, or any other direct or derived mechanism for recording access frequencies for different LBAs. Hint table 202 and the access frequency map 204 may be stored in any suitable location within storage device 100. For example, hint table 202 and access frequency map 204 may be stored in non-volatile storage 106 or in cache memory (e.g., volatile memory such as RAM) that is separate from non-volatile storage 106. In addition, hint table 202 and access frequency map 204 may be combined into a single data structure so that an access frequency is specified for each LBA range entry in hint table 202.

Exemplary Hint Derivation Processes

Figure 3:
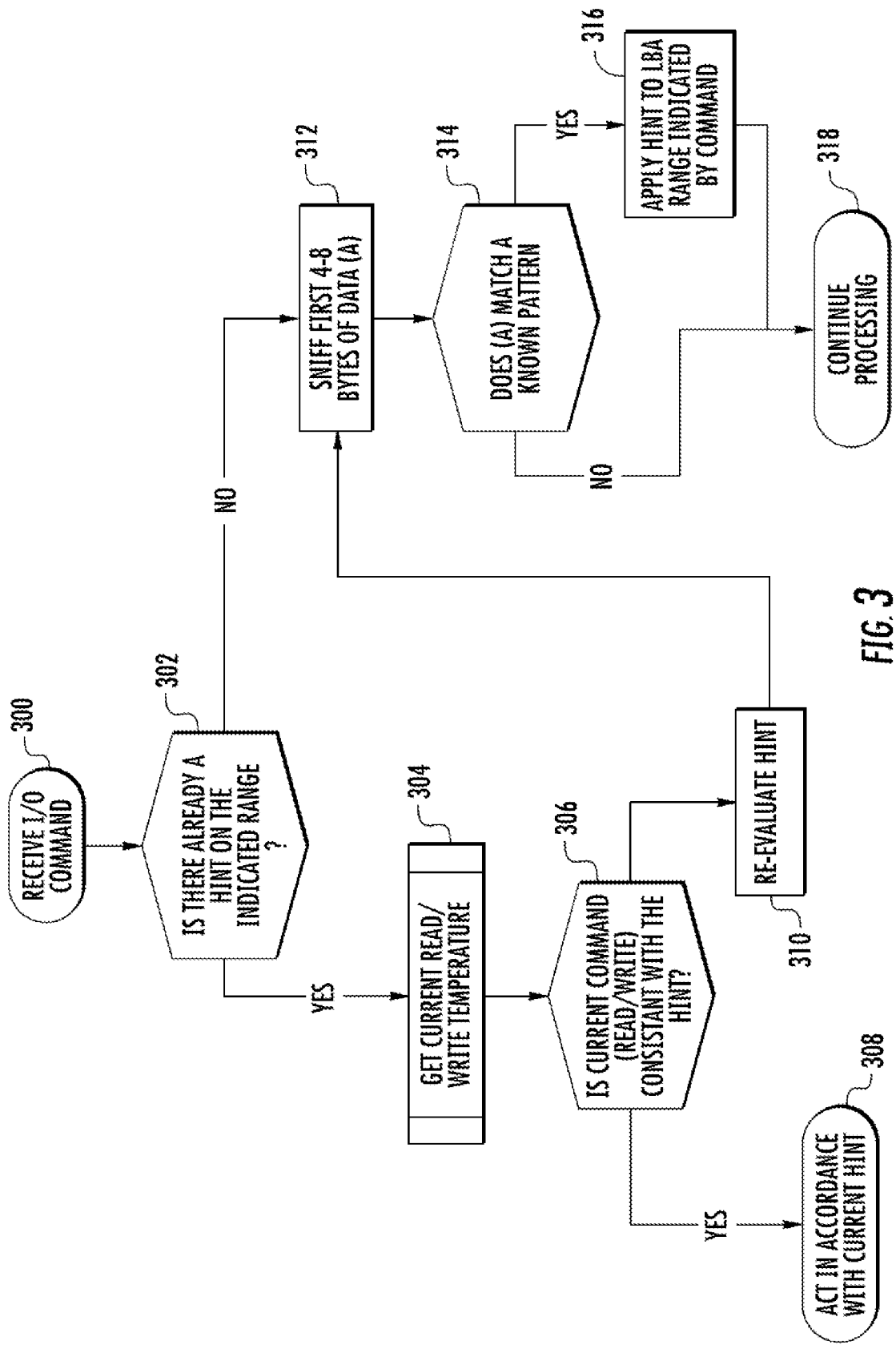
FIG. 3 is a flow chart illustrating an exemplary process for in-line hint derivation and memory utilization optimization according to an embodiment of the subject matter described herein.

FIG. 3 is a flow chart illustrating exemplary steps for in-line hint derivation and corresponding memory utilization optimization according to an embodiment of the subject matter described herein. By "in-line", it is meant that hints associated with the anticipated host memory access pattern are derived by the storage device while performing a host initiated I/O operation. In-line hint derivation and corresponding memory optimization is believed to be beneficial because the anticipated type of memory access for a specific LBA range in an I/O request can be used to determine where to initially store data from the I/O request in the case of a write operation. However, the subject matter described herein is not limited to in-line hint derivation and memory utilization optimization. Hint derivation may be performed asynchronously with respect to I/O operations. Asynchronous hint derivation may not allow optimization of how data is initially stored. However, the data can be subsequently moved to optimize utilization of storage device 100.

Referring to FIG. 3, in step 300, an I/O command is received. The I/O command may be a read command or a write command received by hint derivation module 200. In step 302, it is determined whether or not a hint already exists for the LBA range in the I/O command. In order to determine whether a hint exists for the range specified in the I/O command, hint derivation module 200 may extract the LBA range from the I/O command sequence and perform a lookup in hint table 202 to determine whether an entry for the LBA range is present in hint table 202. Table 1 shown below illustrates exemplary entries that may be present in hint table 202:

TABLE 1

Exemplary Hint Table Entries

| LBA Range | Hint |
| --- | --- |
| 0x00000000-0x3FFFFFFF | JPEG Image File |
| 0x40000000-0x400001F3 | Executable File |
| 0x50000000-0x8FFFFFFF | Swap File |

In Table 1, the left hand column includes LBA ranges corresponding to previous I/O operations by host device 101 for which hints have been derived. The right hand column includes corresponding hints. In the illustrated example, the hints are file types which provide insight as to how the data may be accessed by the host in the future. For example, the first entry in the hint table indicates that the LBA range stores a JPEG image file. A JPEG image file may be a photo that is likely to be written only once and then read sequentially. Such a file is preferably stored in static memory cells that have a relatively lower number of remaining program and erase cycles, as it is unlikely that even for read operations the JPEG image file will be frequently accessed. In addition, the JPEG image file may be distributed across flash memory in a manner that is optimal for sequential read access. It may also be desirable to store the JPEG image file with other JPEG image files that were created around the same time, as accesses to JPEG image files that relate to the same event are likely to occur together.

The second entry in Table 1 is an executable file. Similar to a JPEG image file, an executable file is likely to be written once and then read sequentially when the corresponding program is executed. An executable file may therefore be stored or distributed across memory cells in a manner that is optimal for sequential read access. The executable file may be stored in static or dynamic regions of non-volatile storage 106 depending on the type of program and anticipated frequency of access. For example, if the program is a web browser which is likely to be frequently accessed, the web browser may be stored in a dynamic portion of non-volatile storage 106. If, however, the program is a back-up program that runs only once per week, the program may be stored in a static region of non-volatile storage 106.

The third entry in Table 1 includes a hint that indicates that the file is a system swap file. A swap file is typically, frequently accessed because it enables an operating system to use secondary storage devices, such as storage device 100, to simulate extra memory. When the system runs low on memory, it swaps a section of system Random Access Memory (RAM) that an idle program is using onto the storage device to free up memory for other programs. A swap file is preferably stored in a dynamic region of non-volatile storage 106 in light of the frequent access and low latency requirement of a swap file. A dynamic region of non-volatile storage 106 may, in addition to having a large number of remaining program and erase cycles, be a region with relatively low access latency, as compared with other regions of non-volatile storage 106.

Returning to step 302 in FIG. 3, if a hint is present, control proceeds to step 304 where the current read or write access frequency is determined. This step may be performed by hint derivation circuit or module 200 accessing access frequency data stored for the LBA range in the I/O operation in access frequency map 204. In step 306, it is determined whether the current command is consistent with the hint. Determining whether the current command is consistent with the hint may include examining the command type and/or the access frequency data to determine whether the hint needs to be reevaluated. For example, if the hint stored for a particular LBA range indicates that the file stored is JPEG image file and the command is a write command, the hint may require reevaluation, as it is unlikely that a JPEG file will be overwritten by the host once it is written the first time. In the same example, if the command for the LBA range is a read command for a previously stored JPEG file, then the command is consistent with the current hint. If the current command is consistent with the hint, control proceeds to step 308, where an action is performed in accordance with the current hint. Performing an action in accordance with the current hint may include carrying out the I/O operation and updating the associated access frequency data. Continuing with the JPEG file example, the read command may be executed. If the current command is not consistent with the hint, control proceeds to step 310 where hint re-evaluation begins.

As part of hint re-evaluation, in step 312, the first four bytes of data in the command are analyzed. In step 314, it is determined whether the data matches a known pattern. Table 2 shown below illustrates different patterns that may be analyzed in a Macintosh (e.g., macOS) and Windows-based file operating systems, as examples.

TABLE 2

Windows and MAC OS File System Patterns

| Pattern | Hint |
|---|---|
| "FILE" | NTFS MFT entry |
| "PK" | ZIP compressed file (including JAR files, Android APK files, and compressed document files) |
| "RCRD", "RSTR" | NTFS log metadata |
| 0xFE 0xED 0xFA | Mach-O executable |
| "HIBR" | Hibernate data |
| "MZ" | Windows or UEFI executable |
| 00 00 00 18 66 74 79 70 00 00 00 1C 66 74 79 70 | MPEG-4 video file |
| "ID3" | ID3v2-tagged MP3 file |
| "MDMP" | Windows minidump file |
| "PAGEDUMP" | Windows pagedump file |
| 0x89, "PNG" | PNG Image file format |
| 0x42 0x4D | BMP Image file format |
| "GIF" | GIF Image file format |

In the examples in Table 2, the patterns in the left-hand column correspond to file type in the right-hand column. The file types can be used by storage device 100 to determine how that file will be accessed. For example, if the file is an executable file, it is known that executable files are relatively static. That is, they are typically written once to non-volatile storage, not modified, but may be completely erased and replaced. Thus, an executable file may be written to a static portion of non-volatile storage. In another example, if the data contains the pattern "PK", or is determined to be an image file format, or is determined to be of particular audiovisual file formats, then the file may be determined to be a compressed file. A compressed file is not likely to require recompression and thus may be stored in static portion of non-volatile storage 106.

Continuing with step 314, it is determined whether the first 4 to 8 bytes of data in the data or payload portion of the I/O command sequence matches a known pattern. If the data matches a known pattern, control proceeds to step 316 where a hint is applied to the logical block address range indicated by the I/O command. Applying the hint may include storing the derived hint for the LBA range in the hint table and treating the data in accordance with the identified file type to optimize utilization of the memory storage device. If the hint does not match a known pattern, control proceeds to step 318 where processing is continued. Continuing the processing may include completing the I/O command and updating the access frequency for the LBA range.

As stated above, the subject matter described herein is not limited to deriving hints in-line, although such derivation is desirable because it allows any storage device optimizations to be performed when data is initially stored in non-volatile storage 106. The subject matter described herein also includes deriving hints asynchronously, i.e., performing the I/O operations and deriving hints asynchronously from the I/O operations. Deriving hints asynchronously is likewise beneficial to ensure repeated optimization of storage resources.

Figure 4:
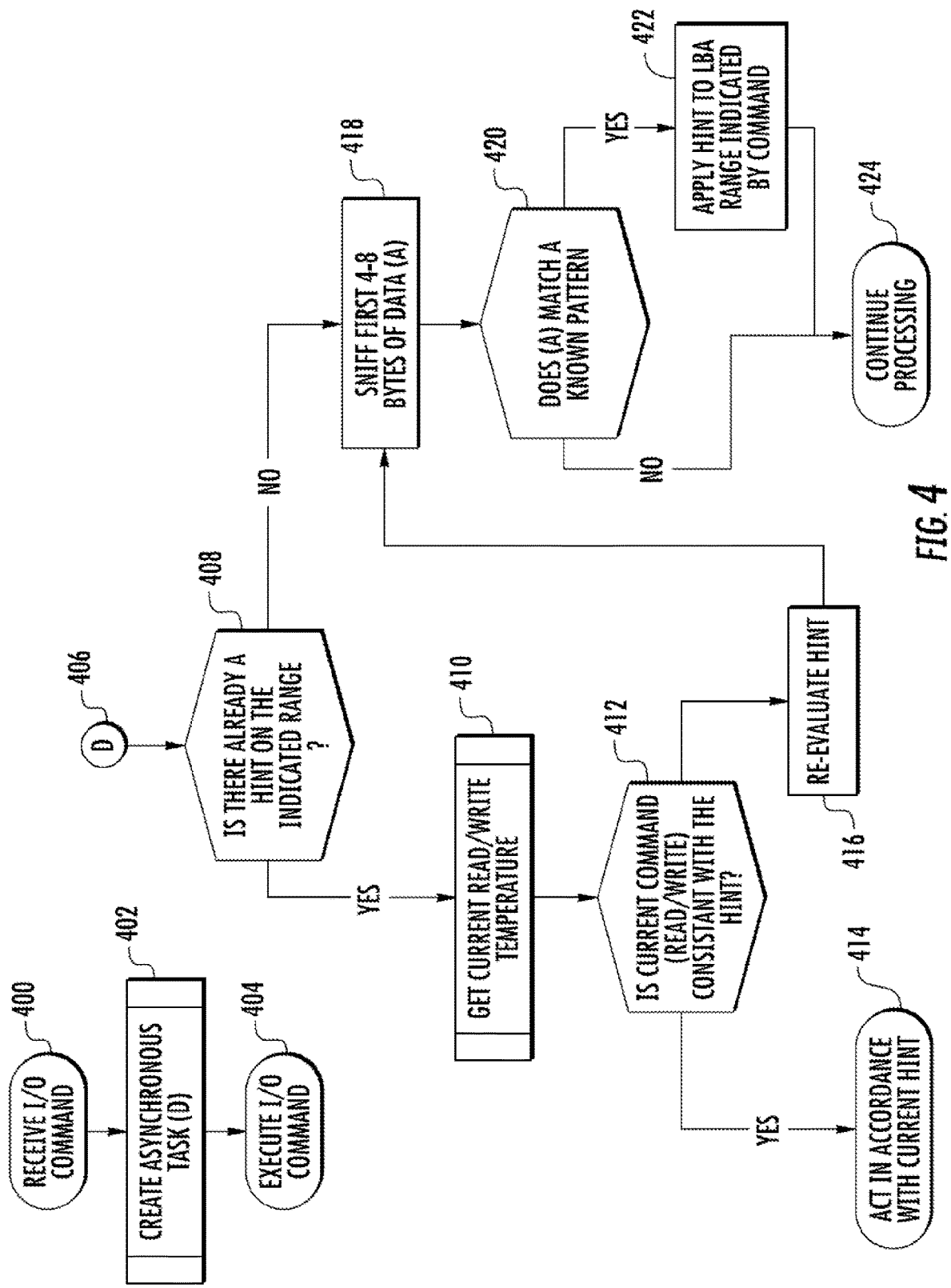
FIG. 4 is a flow chart illustrating an exemplary process for asynchronous hint derivation and memory utilization optimization according to an embodiment of the subject matter described herein.

FIG. 4 is a flow chart illustrating asynchronous hint derivation according to an embodiment of the subject matter described herein. Referring to FIG. 4, in step 400, an I/O command is received. The I/O command may be a read command or a write command regarding a specific LBA range. In step 402, an asynchronous task "D" is created to derive the hint for the I/O command. Creating the asynchronous task may include spawning a thread or process that analyzes the data in the I/O command sequence and any previously stored hints. In step 404, the I/O command is executed independently of the process that derives and acts on the hint. Referring to step 406, asynchronous task D begins its execution. The asynchronous task D executes steps 408-424 to derive the hint and apply the hint. Steps 408-424 are the same as steps 304-318 described above with respect to FIG. 3, with the exception that applying the hint (step 414 or 426) occurs independently of the current I/O operation. For example, applying hints may include marking the LBA ranges in the hint table such that when NAND maintenance operations, read look ahead, or other logical operations optimizing the data are utilized, the hint is available and is used as a method of making decisions about the data. For example, if the hint indicates that the data is temporary, it may be skipped in relocation decisions. Alternatively, if the data is expected to be heavily read but not written often, it may be grouped together with other "hot read" data to reduce read scrub copies of data which is relatively static.

As stated above, hint derivation may also occur by parsing file system metadata. File system metadata refers to data that is written by the file system to non-volatile storage to characterize files. File system metadata may be parsed for hint derivation as it is written to storage device 100, during storage device idle time, or opportunistically during maintenance operations that access the physical blocks in which the metadata is stored. File system metadata typically includes the following information about each file (all attributes are present in the New Technology File System (NTFS) of Microsoft, the Hierarchical File System plus (HFS+) file system of Apple, and the fourth extended file system (ext4) of Linux): (1) Access times (last access, last modification, creation time; (2) Filename; (3) Directory structure; (4) Extent map (map of file offsets to LBA ranges).

In some file systems (such as NTFS and HFS+), the extent map may include resident portions in a central file (called the catalog file in HFS+ and the master file table (MFT) in NTFS), as well as a non-resident extension used for additional extent maps in severely fragmented files. Depending on internal device resources, storage device 100 may elect not to de-reference non-resident extents into hints.

Filename parsing works based on common usage patterns associated with file extensions or directory trees. For example, the Windows operating system uses the "Program Files" and "Program Files (x86)" directories to store executable resources, which are typically static. Furthermore, executables in Windows tend to have an extension of "EXE" or "DLL". Correspondingly, Mac OS X uses directories with the extension ".app" to store executables. (The actual executables in Mac OS X do not have an identifying extension.) Temporary files have a ".tmp" extension or are in a directory called "tmp" or "Temporary Internet Files". Internet browser cache files (which are also short-lived) may have identifying characteristics such as brackets in the filename, enclosing a single digit.

Figure 5:
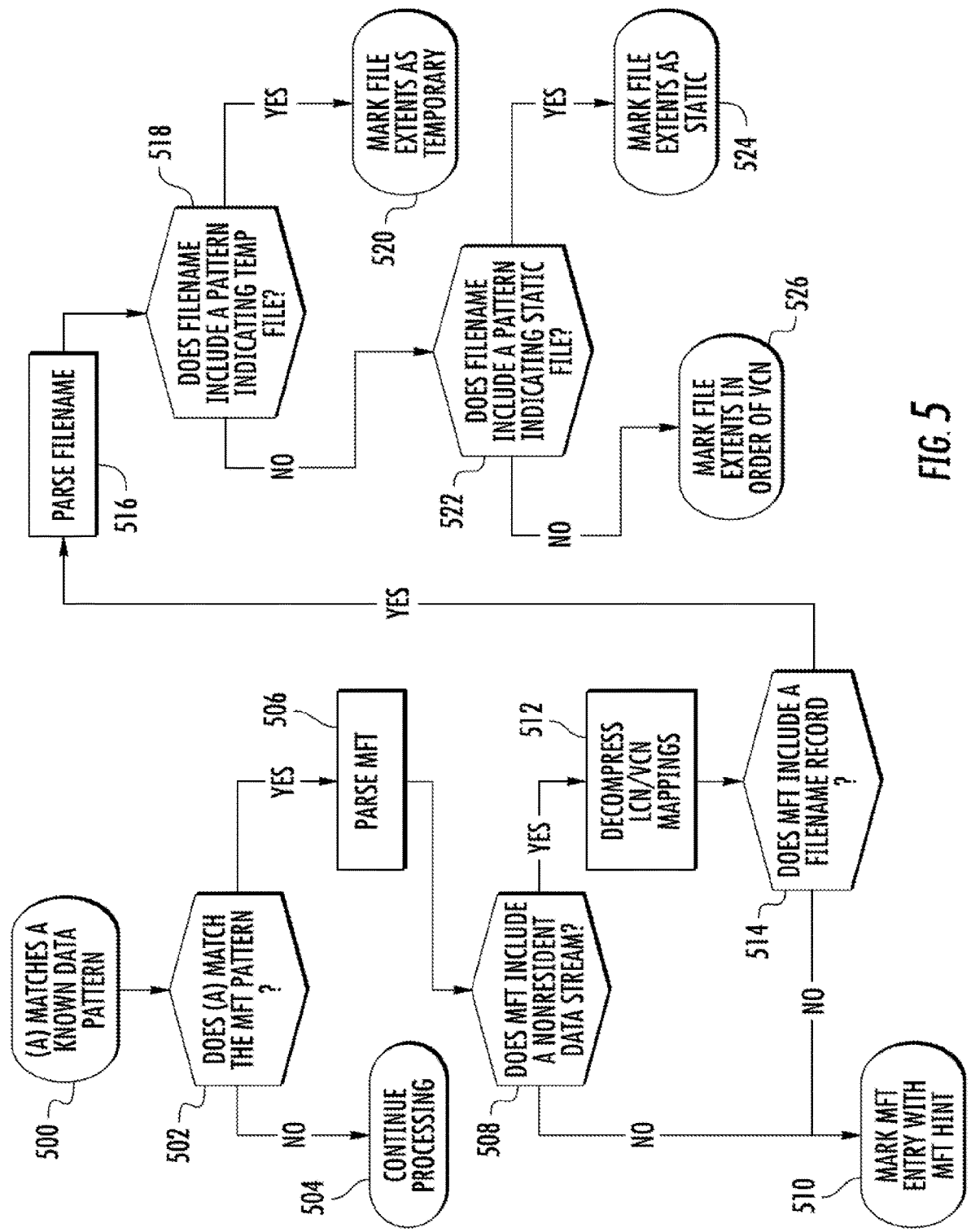
FIG. 5 is a flow chart illustrating an exemplary process for parsing file names in a master file table according to an embodiment of the subject matter described herein.

FIG. 5 illustrates hint derivation by file name parsing according to an embodiment of the subject matter described herein. In step 500, it is determined whether data in an I/O command sequence received by storage device 100 matches a known data pattern. In step 502, it is determined whether the data matches the MFT pattern. As illustrated by the second entry in Table 2, the MFT pattern is the characters "FILE". Thus, if the data parsed from the I/O operation includes the characters "FILE", then the I/O operation may be determined to be a write to the MFT table. If the operation does not match the MFT pattern, control proceeds to step 504 where processing is continued. Continuing the processing may include performing another type of hint derivation, such as based on last written and last read attributes maintained by the file system as will be described in more detail below.

In step 502, if the data matches the MFT pattern, control proceeds to step 506, where the MFT is parsed. Parsing the MFT includes locating the MFT entry corresponding to the I/O operation. Parsing the MFT continues in step 508, where it is determined whether the MFT entry stores a nonresident data stream. A non-resident data stream is a file whose location is specified in the MFT entry, but which is stored external to the MFT. A resident data stream is a file that is stored in the MFT entry. Accordingly, a write to the MFT for a resident file is a write to the file. Thus, if the MFT entry has a resident file, control proceeds to step 510 where the MFT entry is marked with a hint indicating that the entry includes an MFT resident file.

Returning to step 508, if the MFT entry includes a non-resident data stream, i.e., a pointer to one or more locations outside of the MFT that stores the corresponding file, control proceeds to step 512 where the logical cluster number/virtual cluster number (LCN/VCN) mappings that indicate storage locations for a non-resident file are decompressed. In step 514, it is determined whether the MFT entry includes a file name record. If the MFT entry does not include a file name record, control returns to step 510 where the entry is marked with an MFT hint. An MFT hint may explicitly identify the entry as an MFT entry.

If the MFT entry includes a file name record, control proceeds to step 516 where the file name is parsed. File name parsing continues in step 518 where it is determined whether the file name includes a pattern indicating a temp file. File names for temp files vary per operating system. In a Windows-based operating system, a temp file may end with the suffix ".tmp" or may include closed brackets that surround a single number. If the file name pattern indicates a temp file, control proceeds to step 520 where the file extents that store the file are marked as temporary. Marking the extents as temporary may include inserting hints in the MFT table that marks the extents as temporary or adding entries to the hint table that mark the LBA ranges corresponding to the file extents or containing a temp file.

Returning to step 518, if the file name does not include a pattern identifying the file as temporary, control proceeds to step 522 where it is determined whether the file name includes a pattern identifying a static file. As described above, examples of static files are executable files and sometimes image files. If the file name includes a pattern identifying the file as static, control proceeds to step 524 where the extents are marked as static. If the file name does not include a pattern indicating a static file, control proceeds to step 526 where the extents are marked in the order specified by the virtual cluster numbers in the MFT table. The purpose of ordering the extents allows the storage device to know the order of data in the file so that the device can reorder the file for optimal host access. Reordering the file may include storing the extents of the file in different memory blocks so that they can be read out in parallel.

As stated above, another approach to parsing file system metadata is to parse last written and last read attributes in the file system and to combine these attributes with correctable error count rates or with internal counters in order to determine the access frequency of the read and optimize read scrub algorithms. Correctable error rates would correlate with increased read activity in some storage types and may be augmented by device based historical data collected on reads and writes to extents that map to files that are expected to be heavily accessed.

Figure 6:
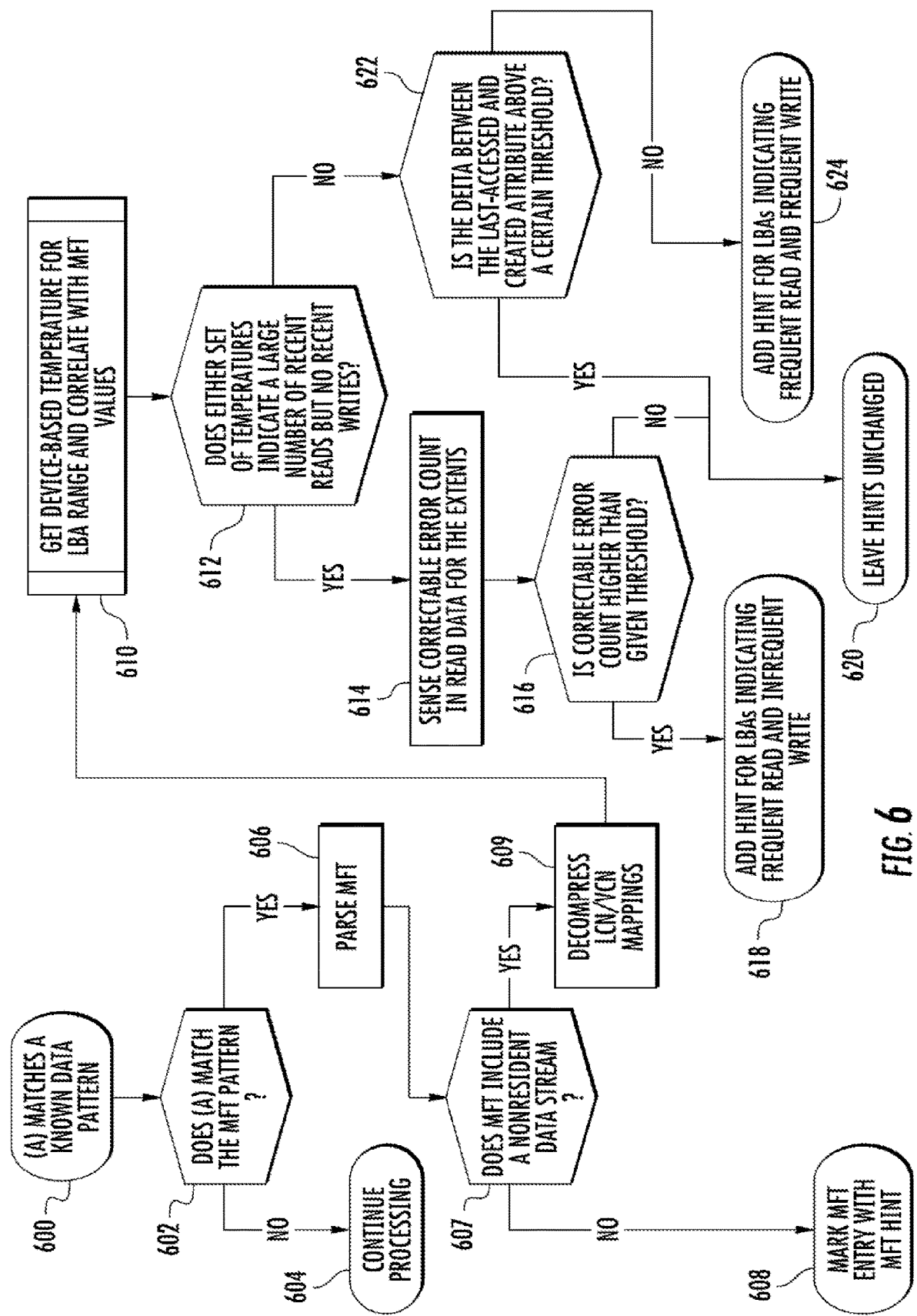
FIG. 6 is a flow chart illustrating an exemplary process for deriving hints from frequently read and frequently accessed attributes in a master file table according to an embodiment of the subject matter described herein.

FIG. 6 is a flow chart illustrating an exemplary process for deriving hints from frequently read and frequently accessed attributes in a master file table according to an embodiment of the subject matter described herein. A frequently read or frequently written hint can be based on combinations of these two inputs, as described below with respect to FIG. 6. Referring to FIG. 6, in steps 600 and 602, it is determined whether the file and the data in an I/O request match the MFT pattern. As described above, the MFT pattern in a Windows file system is the word "FILE". If the file name does not match the MFT pattern, control proceeds to step 604 where additional processing is performed to determine whether the data matches any of the other patterns described above.

If the data in the I/O request matches the MFT pattern, control proceeds to step 606 where the MFT is parsed. Parsing the MFT may include locating the MFT entry corresponding to the I/O operation. In step 607, it is determined whether the MFT entry includes a non-resident data stream. If the MFT entry includes a resident data stream, control proceeds to step 608 where the entry is marked with a hint indicating that the LBA range in the I/O request corresponds to an MFT resident file. If the MFT entry includes a non-resident data stream, control proceeds to step 609 where the LCN/VCN mappings are decompressed to determine the locations of the extents that store the non-resident file. Once the LCN/VCN (e.g., logical cluster number/virtual cluster number) mappings are determined, control proceeds to step 610 where the device based access frequency for the LBA range is obtained from the access frequency map and that access frequency is correlated with the MFT attributes that correspond to file access frequency. In step 612, it is determined whether either set of access frequency data indicates the large number of reads but no recent writes. If the access frequency data indicates a large number of reads but no recent writes, control proceeds to step 614 where a correctable error count is sensed in read data for the extents. In step 616, it is determined whether the correctable error count is higher than a given threshold. If the correctable error count is higher than a given threshold, control proceeds to step 618 where a hint is created for the LBAs indicating frequently read and infrequently written. If the correctable error count is not higher than a given threshold, control proceeds to step 620 where the hints associated with the LBA range are left unchanged.

Returning to step 612, if it is determined that either set of access frequency data does not indicate a large number of reads but no recent writes, control proceeds to step 622 where it is determined whether the difference between the last accessed and created attribute is above a threshold. If the last accessed and created attribute is above the threshold, this means that the file is static, and control proceeds to step 618 where the hints are left unchanged. If the difference between last accessed and created attribute is not above the threshold, this means that the file is frequently read and written, so control proceeds to step 624 where a hint is added to the logical block addresses indicating frequently read and frequently written data. As described above, hints that indicate frequently read and frequently written data can be used to place the data in a region of the storage device that contains memory cells with a larger comparative number of remaining program and erase cycles.

Although in the examples illustrated in FIGS. 5 and 6 file system metadata is parsed in the context of a request, the subject matter described herein is not limited to deriving hints from file system metadata in the context of an I/O request. File system metadata constitutes data that is stored in non-volatile memory. Accordingly, such metadata can be parsed independently of I/O operations to derive hints associated with LBA ranges corresponding to files referenced in file system metadata.

In addition, the subject matter described herein is not limited to parsing timestamps and filenames to derive hints. Another type of file system metadata that may be used for hint derivation are file attributes (read only, hidden, system, compressed) that can also be extracted to help with hinting. For example, if a file is marked read only, then it is not likely that the file will be modified and the file can be stored in a static portion of non-volatile memory 106. Similarly, if a file is marked as hidden or system, this typically refers to the file is being a part of the operating system. A file that is part of the operating system is one that is not likely to be modified, so it could also be stored in a static portion of non-volatile memory 106. The file attributes can be combined with any of the attributes or other sources described herein for enhanced hint derivation.

Machine Learning

The above described hint derivation based on accesses to the storage device and file system metadata provides for better optimization of the storage utilization and performances utilizing a heuristic approach to the derivation. In further aspects however, the methods and apparatus may further employ a machine learning algorithm (MLA) for deriving hints. In particular, a machine learning based FTL circuit or logic may be employed that clusters the LBAs and/or PBAs to derive hints, and based on such derivations performs various memory management operations such as block allocations and relocations.

It is noted that a new cell voltage distribution (CVD) time tag (TT) group is typically defined for all writes after a mount process of an SSD is completed. It is further noted that CVD involves the division of multi-level cell non-volatile memory systems into voltage regions, where each voltage region defines a state. For example, with a two (2) bit per cell system (e.g., multi-level cell (MLC)), four (4) separated distributions define four (4) states, or in a triple level cell system (TLC) there are eight (8) separated distributions that define eight (8) states. Furthermore, it is noted that time tags (TTs) are used to characterize blocks. Parameters included in the TT may include the block read voltages that separate the voltage distributions (i.e., CVD). For example, with a TLC system, seven (7) read thresholds are used to define the eight (8) separate state voltages.

Due to wear leveling and compaction relocation operations, data with different CVD time tags may be mixed in physical blocks that do not correspond anymore to the same user file or time tag to which it was written originally by the host and, thus, can be expected to be erased later at different times increasing the relocation and garbage collection workload. Therefore, due to compaction and relocation, the time tag information is lost where new time tags are given to all data written to a new physical block according to the time it is written and ignoring the data history. Furthermore, due to the variance in physical characteristics of blocks, blocks that have the same time tag (i.e., were written approximately at the same time, such as after the same mount process) may have actually different CVDs and optimal read thresholds. Hence clustering of LBAs and/or PBAs by the FTL according to derived hints and taking more physical characteristics or parameters into account beyond the time tag (TT) may improve both performance and endurance as will be described below.

To address such concerns, the FTL circuit or logic 104 may be configured to cluster those LBAs that are invalidated together (e.g., LBAs relocated together). Because the LBAs have been invalidated together (e.g., relocated together), this characteristic hints or suggests, that they refer to or belong to the same or a common user file or the other host file (e.g., a learned derived hint). Thus, according to aspects of the present disclosure, LBA clusters that are allocated or assigned to clustered physical open blocks, which could be a metablock or a super block which during relocation operations may be erased together later in wear leveling operations. As used herein, a metablock or superblock refers to a grouping of blocks that are managed by the FTL as an atomic unit, such as being read and written together. The group of blocks may be located physically at separate NAND dies accessed in parallel by the controller, may be linked statically at the beginning of device life or may be linked dynamically each time a new metablock needs to be allocated. Accordingly, these LBAs will remain clustered and the overall number of relocations will be decreased, write amplification will be reduced, and wear-leveling will be optimized, thereby improving both performance and endurance.

As used herein, the term characteristic or physical characteristic refers to quantifiable characteristics associated with respective LBAs/PBAs that are tracked and/or maintained. Additional available physical characteristics that may be utilized for determining the clustering of LBAs and PBAs include: (1) access frequency to the LBAs, (2) the block program-erase cycles (PECs) of the mapped PBAs, (3) the CVD read thresholds, (4) average bit error rates (BERs), and (5) the temperature the blocks were written (i.e., cross temperature effect), or other similar characteristics that hint that certain LBAs may be linked and writing them to PBAs that are similar is favorable, which may serve to optimize read thresholds and minimize their Bit Error Rates (BERs). In addition, the methods disclosed herein may include linking blocks (LBAs or PBAs) to metablocks according to LBA and PBA clusters, which may improve read performance by providing a maximal efficiency for parallel read access and a low BER, which will provide fast decoding. Accordingly, the available free blocks (PBAs) may also be clustered according to their physical characteristics (the block PEC, the read thresholds, BER, written temperature and the like) and the FTL will be configured to allocate or assign free blocks from PBA clusters to LBA clusters that are linked according to the presently disclosed hint derivation.

Exemplary Data Storage Devices for Grouping LBAs Using Machine Learning

Figure 7:
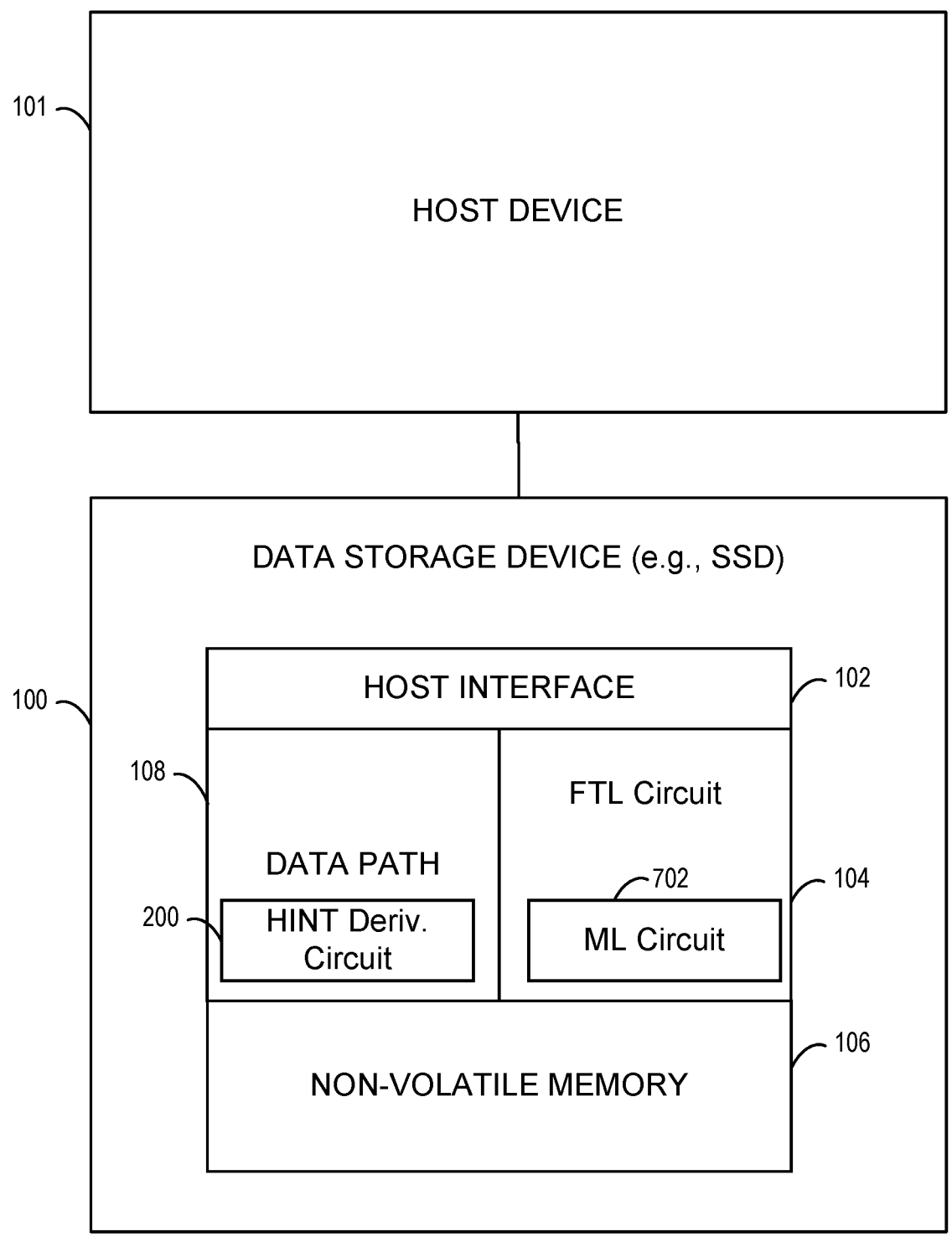
FIG. 7 is a block diagram illustrating another exemplary operating environment for the subject matter described herein.

Turning back to the figures, FIG. 7 is a block diagram illustrating another exemplary operating environment for the subject matter described herein. As may be seen in this figure, like numbered elements are shared with the system of FIG. 1, and accordingly their descriptions and functions are not repeated here for sake of brevity. The system of FIG. 7 illustrates that the FTL circuit or logic 104 may further including a machine learning (ML) clustering module or machine learning circuit 702 (e.g., ML circuit), which may be configured to perform the various clustering and classification functions described herein including grouping LBAs together into one or more clusters of LBAs based on derived hints and a machine learning (ML) circuit processing of one or more characteristics of the storage device. In particular, the present methods and apparatus may use ML algorithms for deriving hints, which are used to perform various memory management operations such as block allocations and relocations. As part of this operation, the FTL circuit or logic 104 may be configured to group or cluster LBAs that are invalidated together (e.g. relocated together), which provides a hint that they belong to the same or common user file or the other host file (e.g., a learned derived hint).

In one aspect, the hint derivation circuit or module 200 may be used to derive one or more hints for LBAs of data storage device 100 based on information received from host device 101 and/or one or more physical characteristics of the storage device 100. In other aspects, the hint derivation circuit or module 200 may be used to derive one or more hints that LBAs refer to a common user file in the storage device based on one or more physical characteristics of the storage device. In one aspect, ML circuit 702 may be configured to associate LBAs with PBAs in the data storage device based on hints derived from a host device or a plurality of physical characteristics of the data storage device or any combination of host's derived hints and the device's physical characteristics.

As part of the clustering, the FTL and associated modules may employ a dimension reduction analysis, process, or algorithm to reduce the number of datasets that need to be considered by projecting features or characteristics to lower dimensions. For example, a statistical analysis such as an eigenvector-based multi-variable analysis of a multi-variable dataset may be utilized. In such analysis, the dataset may be visualized as a set of coordinates in a high-dimensional data space (e.g., 1 axis per variable), where the analysis can then be used to derive a lower-dimensional picture. In another example, a principal component analysis (PCA) scheme may be used to convert observed or monitored input features or characteristics of the LBAs (and PBAs) into principal components to project these features to lower dimensions and then use a clustering algorithm on both the LBAs and PBAs. In this manner, the clustering or grouping of LBAs or PBAs into clusters may account for the various input features or characteristics of the host device (e.g., the LBA inputs) and the storage device itself to attempt to determine hints about what the host is doing, and what is happening within the storage device. According to some aspects, the one or more characteristics (e.g., physical characteristics) of the storage device may include LBA ranges, invalidation times, LBA types according to associated metadata, read access frequency of the LBAs, program-erase cycle (PEC) counter values of mapped physical block addresses (PBAs), CVD read thresholds, average bit error rates, and the temperature of blocks to which the host is writing.

FIG. 8 illustrates an example of a table 800 showing a dataset of the input features or characteristics that may be monitored and recorded as part of the principal component analysis (PCA). Table 800 may be maintained by the FTL circuit or logic 104 and stored in RAM (not shown) used by the FTL, but is not limited to such, and may be maintained in other front or back end processing portions of the SSD 100. As may be seen in table 800, for each range of LBAs 802, features or characteristics monitored may include the LBA type metadata 804 (e.g., metadata indicating FTL, Excel, JPEG, etc.), the program-erase cycles (PECs) 806 of the range of LBAs, read parameters of the LBA range 808 including default values (i.e., "def") or other values besides the default values, read frequency of the LBA range 810, the code rate 812, and temperature of the LBA range 814, which may be used to determine if there is cross temperature effect indicative of linking of LBAs. According to particular aspects, the block read voltage parameters 808 may include indication of the states that constitute the voltage distributions (CVD). For example, with a TLC system, a seven (7) read threshold is used to define the eight (8) separate state voltages. The exact location of the seven (7) read threshold is adjusted from time to time to give the best read performance, e.g., lowest BER and these best values per block are stored with the block time tag. Moreover, the code rate 812 is the ratio between data bits k, and added parity bits r, where a codeword length n is defined as n=k+r, is the codeword length. The code rate is equal to k/n such that when there are a fewer number of parity bits (i.e., r<<k) the code rate is higher. Of note, the specific values indicated in the table of FIG. 8 are merely exemplary for purposes of illustration and are not intended to limit the disclosure to these particular values.

Each of the various information monitored in table 800 may be useful to derive hints that the LBAs are linked, and ultimately for determining grouping of the LBAs into clusters using various clustering methods as will be described in more detail below. In a further aspect, it is also noted that available free PBAs may also be also clustered according to their monitored physical characteristics such as the block PEC, the read thresholds, their BER, and written temperature, wherein the FTL will also be configured to allocate free blocks from PBA clusters to LBA clusters that are linked. In one aspect, PBA clustering can be useful for various FTL functions such as read scrub, updating read thresholds, and other FTL functions. In one aspect, PBA clustering may be used also as a standalone function of deriving hints for dynamic allocation of PBAs to metablocks and for other FTL functions such as read scrub and threshold adjustments.

In such case, the PBA clustering can be used in addition to, or even apart from, the LBA clustering.

The grouping of LBAs or PBAs into clusters (e.g., clustering) based on the PCA may further include calculation of a symmetric covariance matrix based on the dataset of input features, diagonalizing the covariance matrix, and the using the eigenvectors and eigenvalues derivable from the diagonalized covariance matrix for projection to a lower plane to achieve a more informative viewpoint, such as a two-dimensional plane. In such case, this is done by using only the first two principal components so that the dimensionality of the transformed data is reduced, where the first principal component has the largest possible variance and each succeeding component in turn has the highest variance possible under the constraint that it is orthogonal to the preceding components. Thus, in an aspect, the two eigenvectors having the largest or highest and next largest or highest eigenvalues of the diagonalized covariance matrix are selected as the two dominant PCA vectors. These two PCA eigenvectors are then used to project to a lower dimension (e.g., a two-dimensional plane) in an exemplary implementation, although it is noted that three or more dimensions may also be used in the PCA analysis, although this increases the computation complexity.

Figure 9:
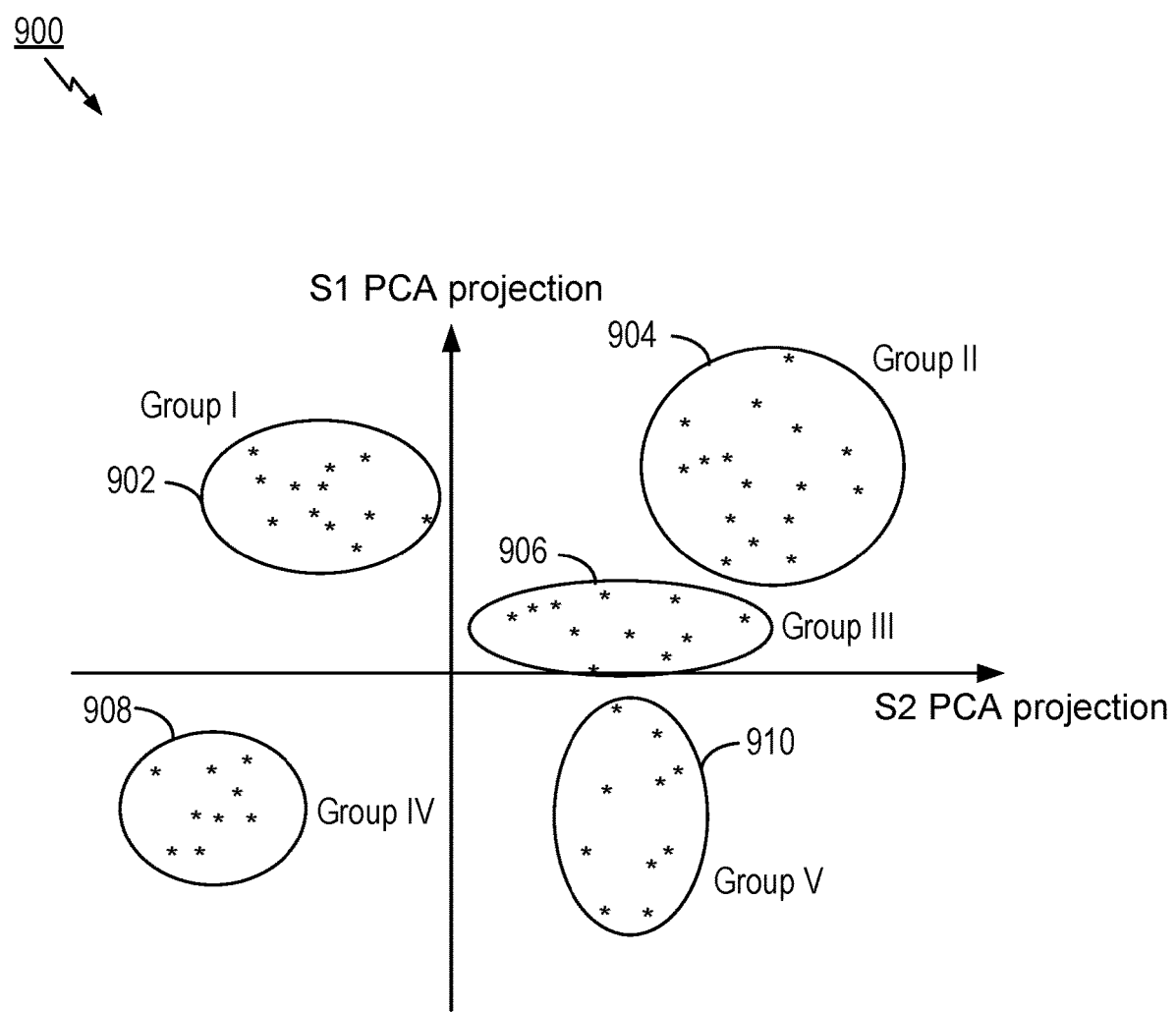
FIG. 9 illustrates an example of clustering according to the PCA analysis disclosed herein.

FIG. 9 illustrates an exemplary projection 900 of the input feature dataset of FIG. 8 in two dimensions using the PCA. Each axis of the projection is a respective dominant eigenvector (S1 and S2), which are the vectors with the two highest eigenvalues. Once the projection of the dataset is accomplished in two-dimensions in this particular example, grouping of similar LBA or PBA related dataset points may be performed using a statistical cluster analysis, machine learning, or "clustering". Different clustering processes, which may constitute supervised or unsupervised machine learning (ML) schemes, include k-means clustering, hidden Markov model (HMM), Gaussian mixture models (GMM), neural network models, or random decision forests, as just a few examples. Other examples of dimension reduction processes that may be utilized include non-negative matrix factorization (NFM), kernel PCA, linear discriminant analysis (LDA), generalized discriminant analysis (GDA), or autoencoding. FIG. 9 illustrates examples of resultant groups or clusters of LBAs (or PBAs) shown as Groups I-V (i.e., 902, 904, 906, 908, and 910, respectively) that may be determined from application of the clustering process or algorithm.

In further aspects, the FTL 104 may be configured to assign PBAs to the LBAs according to determined clusters. It is noted that the above described PCA projection is a simple calculation that may be performed for each new host write access or flash management operation. Thus, the LBAs and PBAs may be assigned or allocated to determined clusters (e.g. to Group I, Group II, Group III, etc.) with each host write or flash management operation. It is also noted that the presently disclosed PCA projection scheme will inherently take into account correlations between LBAs since LBAs that belong to the same word file, for example, or picture, video or audio files, as other examples, will have similar features and will be projected by the PCA scheme to the same LBA cluster.

Exemplary Processes for Grouping LBAs

Figure 10:
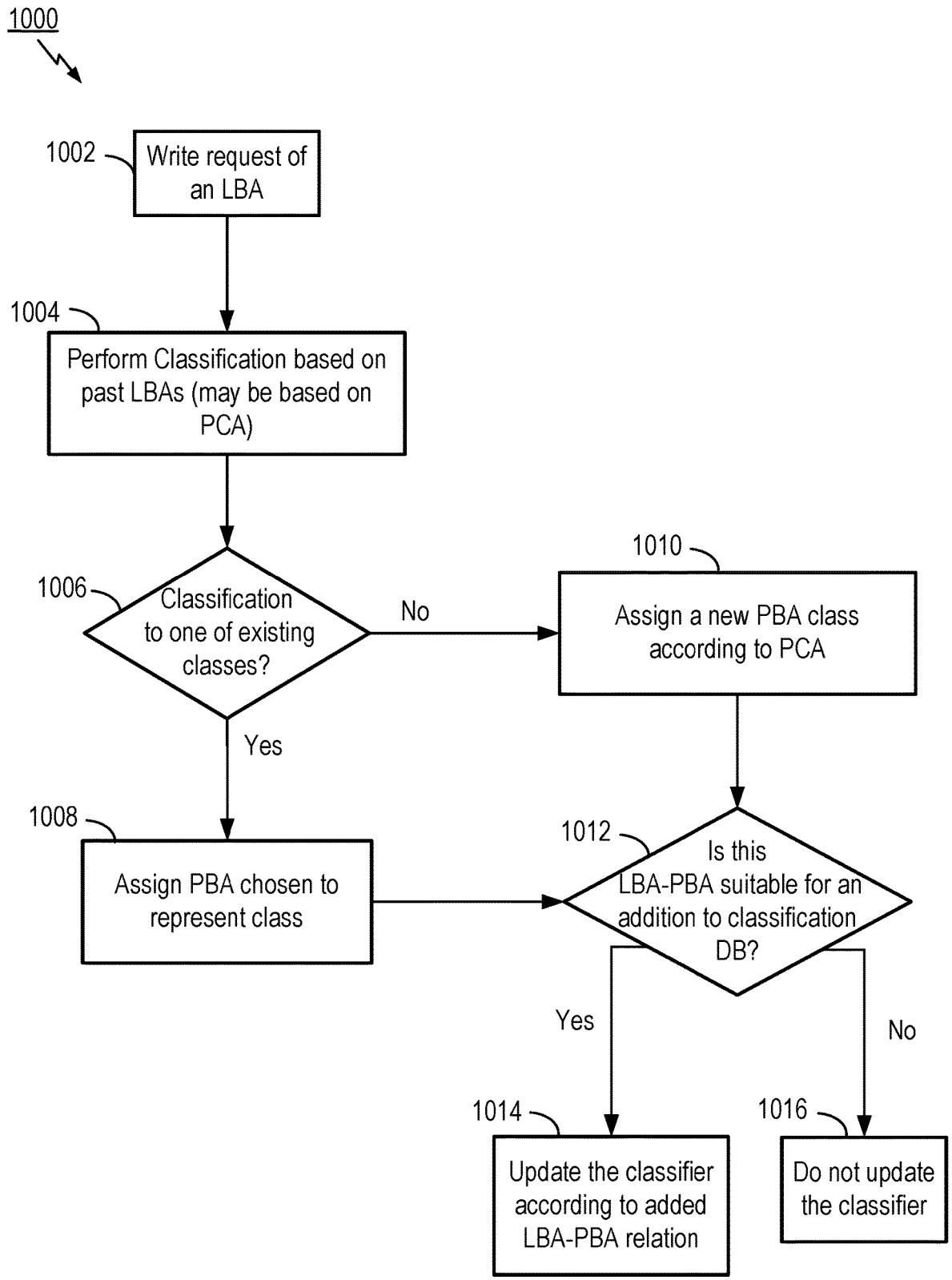
FIG. 10 is a flow diagram of a general grouping, classification, or clustering process that may be utilized according to certain aspects of the present disclosure.

FIG. 10 illustrates a flow diagram of a general grouping, classification, or clustering process 1000 that may be utilized according to certain aspects of the present disclosure. It is noted that process 1000 may implemented within the SSD 100, and the FTL 104, in particular, but is not limited to such. For example, portions of the process 1000 may be implemented on an external server or host having greater computational capabilities.

As may be seen in block 1002 of FIG. 10, when a write request of an LBA is received in an SSD from a host, for example, a classification may then be performed based on past LBAs received in the SSD as shown at block 1004, and may include use of the PCA process described above. In an aspect, the classification processes of block 1004 may include clustering or grouping processes such as clustering based on given features or characteristics of each sample using methods such as one or more of k-means clustering, a hidden Markov model (HMM), an expectation maximization/minimization (EM) clustering using Gaussian mixture models (GMM), a neural network model, density based spatial clustering of applications with noise (DBSCAN), mean-shift clustering, agglomerative hierarchical clustering, or a random decision trees/forest as examples. Furthermore, it is also possible to include a preliminary stage of dimension reduction that translates the representing feature of each sample to a lower dimension representation. Moreover, the processes of block 1004 may include allocation of which clusters should be related to at least one other LBA. In an aspect, the allocation may include using different distance metrics, such as a Euclidian distance of the new sample features values to the representing values of each of the group/cluster.

After block 1004, flow then proceeds to decision block 1006, where a determination is made whether the classification of the LBA belongs to one of a number of existing classes. It is noted that the decision regarding classification to one of the existing classes may depend on a loss function, such as a squared distance from the mean of the class-assigned samples, wherein if the squared distance from the mean is greater than a threshold, the classification would not belong to that existing class, for example.

If the classification is determined to belong to an existing class in block 1006, flow proceeds to block 1008 where the LBA is assigned to a PBA chosen to represent the class. Alternatively at block 1006, if the classification is not to one of the existing classes, the LBA will be assigned to a new PBA class according to the PCA methodology disclosed herein as shown at block 1010 (e.g., a new PBA class will be assigned using the PCA method from the existing pool of free PBAs).

In either the case of flow proceeding to block 1008 or block 1010 from block 1006, flow proceeds from both paths to decision block 1012. Here, a learning-type determination is made concerning the suitability to open a new classification based on the assignment or allocation of the LBA to a particular PBA class in either case of block 1008 or 1010. In an aspect, this determination whether to open a new class or re-arrange classes to incorporate or accommodate a new LBA and PBA may be based on another loss function such as an average distance from the classes' center and a comparison to a predefined threshold, where if the average distance is greater than the threshold, a new classification or class would be added as may be seen at block 1014. Otherwise, no new classification would be added, as shown in block 1016. Of further note, the number of classes that may be used in a specific controller may be a fixed number, i.e. 32, 48, 64, 128, or more and a condition will occur at some point during the device life time where all LBA and PBA classes are already in use. In such cases, in decision block 1014 a process of compacting two or more most adjacent classes and releasing a new class for further use may be performed. An exemplary compaction process as described in U.S. patent application Ser. No. 15/640,297 entitled "COMPACTING OPERATING PARAMETER GROUPS IN SOLID STATE MEMORY DEVICES" and U.S. patent application Ser. No. 15/640,356 entitled "OPERATING PARAMETER OFFSETS IN SOLID STATE MEMORY DEVICES," both filed on Jun. 30, 2017 and the subject matter of which is incorporated herein by reference, may be utilized in accordance with aspects of the present disclosure.

In a further aspect, it is noted that the ML processes disclosed herein could conceptually include two stages: (1) a learning stage, which may be a cluster learning stage, and/or (2) and a deployment stage, which may be an ongoing cluster assignment stage. For the learning or training stage, which may have a higher computational cost, this stage could be performed off-line during set-up or development stages, and may include the determination of which inputs, characteristics, or parameters should be applied later operationally. In certain aspects, the learning stage may include canvasing a large, representative number of flash devices having different benchmarks typical to the host for each flash device in order to prepare the input features shown in table 800 in FIG. 8. The, the remainder of the PCA analysis of calculating the covariance matrix and determining the two dominant PCA eigenvectors could be determined based on the populated table 800. Of note, however, different host behaviors may result in different covariance matrices for example and different PCA eigenvectors in some instances. Thus, the learning stage may be performed during idle time background operations (BKOPs) for pre-processing and model learning and provide better performance in foreground forward operation.

The deployment or forward stage of the ML processes would be configured to utilize the already defined function based on the first leaning training stage for allocation of LBAs and PBAs, and may usually be operated with low computational cost in foreground operation. As mentioned above that the proposed machine learning or training can be performed in flash systems using BKOPs in idle time, where application of the learned forward model may be done in foreground operations, which correlates the machine learning concept (training and forward stages) with flash management concepts (foreground and background operations).

Figure 11:
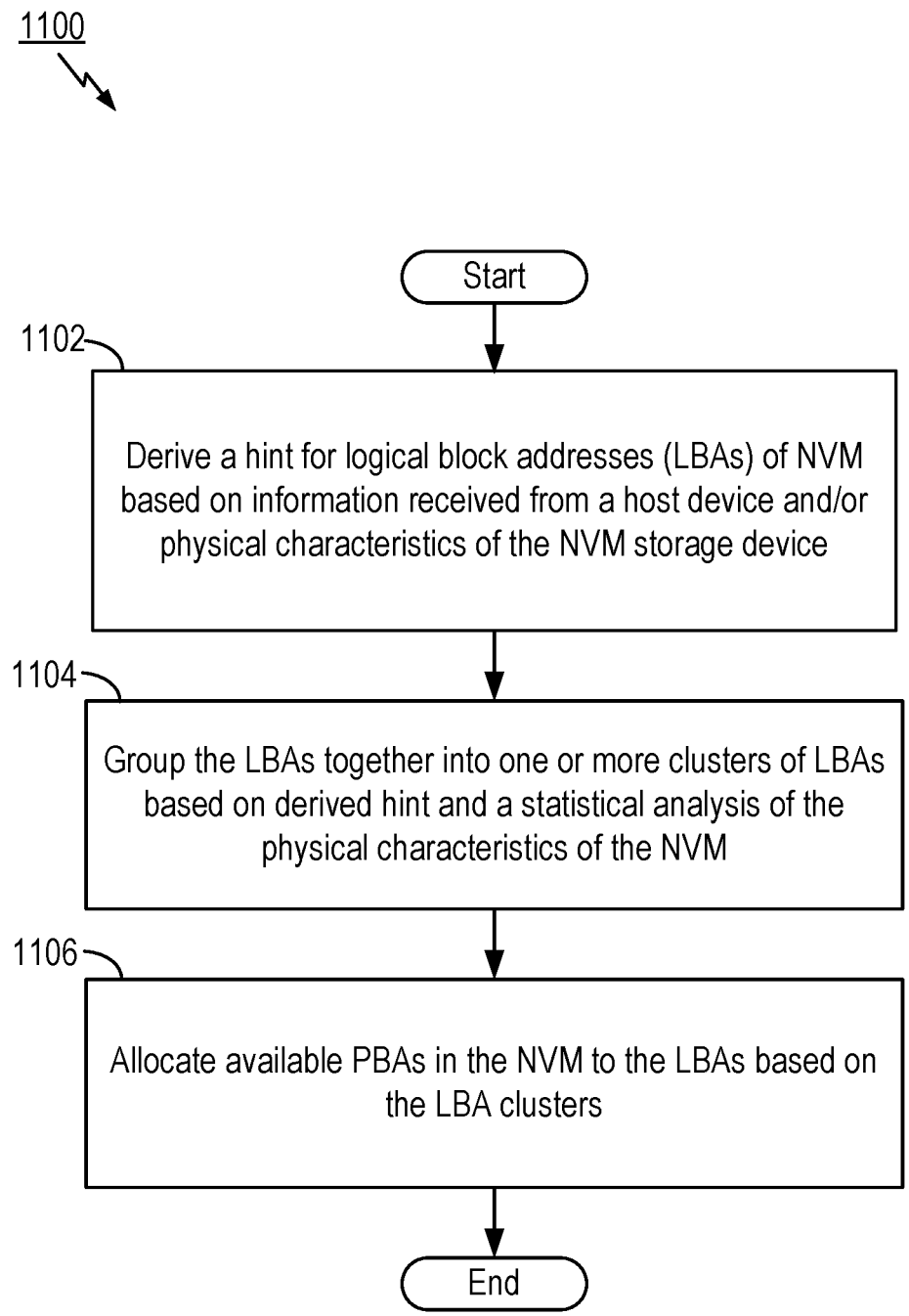
FIG. 11 a flow diagram of another exemplary methodology that may be utilized according to certain aspects of the present disclosure.

FIG. 11 illustrates another exemplary method 1100 for managing a storage device including a non-volatile memory (NVM) according to aspects of the present disclosure. In block 1102, the method derives a hint for one or more of logical block addresses (LBAs) based on information received from a host device and/or one or more physical characteristics of the storage device. In another aspect, the method can include deriving one or more hints that the LBAs (e.g., in a flash translation layer (FTL)) belong or refer to a same or common user file in the storage device based on one or more physical characteristics of the storage device. It is noted, however, the process of deriving these hints may also be accomplished in other modules or processing circuitry within an SSD, and may be implemented as a machine learning (ML) process. Furthermore, the one or more physical characteristics of the storage device may include datasets such as that shown in FIG. 8 including LBA ranges, invalidation times, LBA types according to associated metadata, read access frequency of the LBAs, program-erase cycle (PEC) counter values of mapped physical block addresses (PBAs), CVD read thresholds, average bit error rates, and the temperatures of blocks being written to during host write requests. It is noted that these physical characteristics of the storage device are useful for learning at least one hint, such as, that LBAs belong to or refer to a same or common file or block of addresses, and more particularly LBAs that are invalidated or relocated together. In one aspect, the actions of block 1102 may be performed by the hint derivation circuit 200 of FIG. 7 or the hint logic circuit 1210 of FIG. 12. Thus, in one aspect, hint derivation circuit 200 of FIG. 7 or hint logic circuit 1210 of FIG. 12 can perform the actions of block 1102, and thereby provide a means for determining one or more hints for one or more LBAs in the data storage device based on information received from a host device and/or a plurality of physical characteristics of the data storage device, wherein the one or more hints include a hint that one or more of the LBAs have been one of invalidated or relocated together.

Next, in block 1104, the method groups the LBAs together using the FTL into one or more clusters of LBAs based on the one or more derived hints and a prescribed analysis of the one or more physical characteristics of the storage device. It is noted that the processes of block 1104 may be either accomplished during the training or forward stages as discussed earlier. That is, the grouping or classification may be accomplished during training to establish clusters of LBAs, or grouping may be alternatively accomplished during the process of classifying one or more received LBA write requests from a host to an existing cluster (See e.g., blocks 1002, 1004, and 1006 in FIG. 10). In one aspect, the actions of block 1104 may be performed by the machine learning circuit 702 of FIG. 7 or the machine learning circuit 1212 of FIG. 12. Thus, in one aspect, machine learning circuit 702 of FIG. 7 or machine learning circuit 1212 of FIG. 12 can perform the actions of block 1104, and thereby provide a means for clustering the one or more LBAs into one or more clusters of LBAs based on the hint and a dimension reduction analysis of one or more physical characteristics of the storage device.

Further, in block 1106, the method allocates available physical block addresses (PBAs) in the NVM to at least one of the one or more LBAs based on (characteristics of) the one or more clusters of LBAs. In one aspect, the actions of block 1106 may be performed by the machine learning circuit 702 of FIG. 7 or the machine learning circuit 1212 of FIG. 12. Thus, in one aspect, machine learning circuit 702 of FIG. 7 or machine learning circuit 1212 of FIG. 12 can perform the actions of block 1106, and thereby provide a means for assigning available PBAs in the data storage device to at least one of the one or more LBAs based on the one or more clusters of LBAs.

As discussed above, the principal component analysis may comprise calculating a symmetric covariance matrix based on the one or more characteristics, determining at least one eigenvector and eigenvalue based on diagonalization of the symmetric covariance matrix, selecting at least the two greatest eigenvectors having the two greatest eigenvalues as dominant vectors, and projecting groupings of the LBAs to a lower dimensional representation based on the dominant vectors. According to further aspects, method 1100 may include grouping of LBAs into one or more clusters of LBA includes the use of one of k-means clustering, a hidden Markov model (HMM), a Gaussian mixture models (GMM), a neural network model, or a random decision forest. In one aspect, machine learning circuit 702 of FIG. 7 or machine learning circuit 1212 of FIG. 12 can provide a means for performing any of above noted actions in the principal component analysis.

In another aspect, method 1100 may include grouping the available physical block addresses (PBAs) into one or more clusters of PBAs with the FTL or other controller. This grouping may be accomplished according to physical characteristics including one or more of the physical block program-erase cycles (PECs), read thresholds, bit error rates, a written temperature of the block, and allocating, free blocks from the one or more PBA clusters to LBA clusters. The grouping of PBAs into one or more clusters of PBAs includes the use of one of k-means clustering, a hidden Markov model (HMM), a Gaussian mixture models (GMM), a neural network model, or a random decision forest.

In other aspects, method 1100 may include linking particular LBAs being allocated to metablocks according to at least one of the LBA clusters. Moreover, method 1100 may include grouping LBAs together into one or more clusters of LBAs based on the one or more derived hints and a prescribed analysis of the one or more characteristics of the storage device includes classifying a received LBA from a host based on previously determined clusters of LBAs to determine which cluster of LBAs the received LBA should be grouped or included within, such as was discussed in connection with blocks 1002, 1004, and/or 1006 in FIG. 10. Yet in a further aspect, the one or more hints provides or includes at least one hint that one or more of the LBAs have been one of invalidated or relocated together. Thus, in one aspect, machine learning circuit 702 of FIG. 7 or machine learning circuit 1212 of FIG. 12 can represent a means for clustering that further includes a means to classify a received LBA from a host based on previously determined clusters of LBAs to determine which cluster of LBAs the received LBA should be grouped within.

In yet another aspect, method 1100 may include, for at least one received host write request, updating the grouping of clusters of LBAs by adding at least one new cluster of LBAs based on a determination that the allocation of a PBA to at least one LBA has been made where an average distance from a center of a cluster exceeds a pre-defined threshold. It is noted that this process is correlative to the process discussed in connection with block 1012 in FIG. 10, and may be performed with the FTL or SSD controller, or externally as well. In one aspect, machine learning circuit 702 of FIG. 7 or machine learning circuit 1212 of FIG. 12 can represent a means for updating the clusters of LBAs by adding at least one new cluster of LBAs based on a determination that an allocation of at least one LBA to a PBA has been made where an average distance from a center of a cluster exceeds a predefined threshold.

As to the general idea of clustering or grouping, it usually refers to the task of dividing given data set with a large number of data objects into several groups. Each group of data objects (e.g., cluster) will usually contain data objects with similar properties. In several clustering techniques, each group can be defined for example by its mean value (e.g., center), and the related data objects will usually have a low-valued distance to this center value. As such, the center of a cluster can refer to a mean value of some common property of the data objects in the cluster.

Additional Data Storage Devices for Grouping LBAs Using Machine Learning

Figure 12:
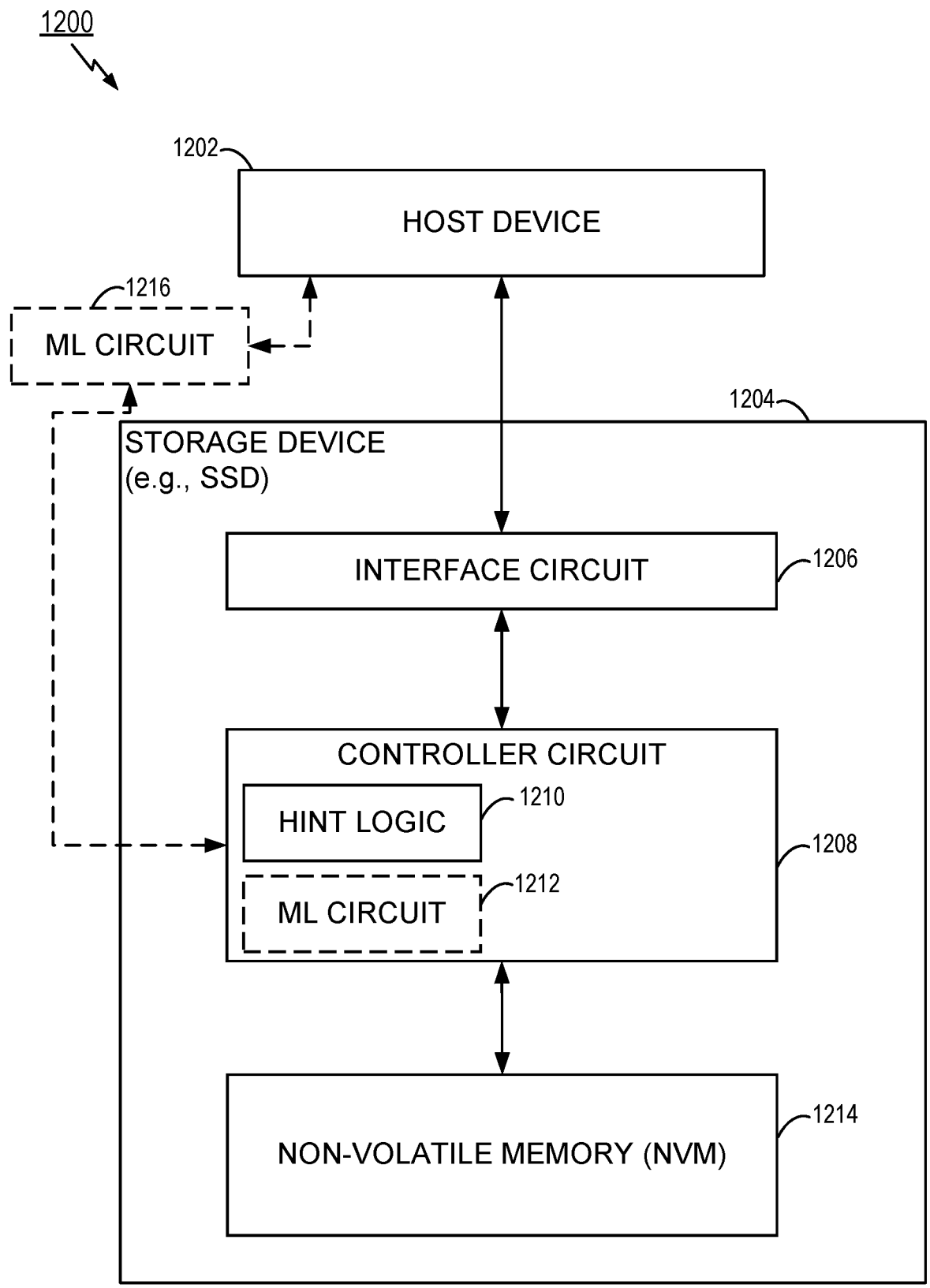
FIG. 12 is a block diagram illustrating another exemplary system for the subject matter described herein.

FIG. 12 illustrates another example of a system 1200 in which aspects of the present disclosure may be implemented. System 1200 includes a host device 1202 accessing a data storage device 1204 (or alternatively memory device where memory device refers to a data storage device including a non-volatile memory (NVM)), such as a solid state drive (SSD), via a communicative coupling or interface circuit 1206 configured for read and write accesses, commands, or from the host device. The data storage or memory device 1204 further includes logic controller circuitry 1208.

In an aspect, logic controller circuitry 1208 may further include logic 1210 configured to derive a hint from received write requests in the interface circuit that one or more logical block addresses (LBAs) refer to a common user file in the data storage device based on one or more characteristics of the memory device (e.g., an NVM 1214). Furthermore, the controller circuitry 1208 may include a machine learning (ML) or clustering logic 1212 (e.g., a machine learning circuit or logic) that clusters LBAs together into at least one LBA cluster based on the derived hints and a statistical analysis of the plurality of characteristics of the memory device, where the statistical analysis may be a dimension reduction analysis.

In certain aspects it is noted that system 1200 may include at least a portion of the ML circuit or logic in an external server or similar device external to the data storage or memory device 1204 as shown by optional block 1216. In such case, some or all of the clustering computations, for example, may be performed within the system 1200 in a ML server external to the memory or the data storage device 1204. In another example (not shown), the ML logic or circuitry 1216 and attendant functionalities may be implemented within the host device 1202. Thus, in one aspect, the system 1200 may include a machine learning circuit communicatively coupled to the controller and configured to perform at least a portion of processing used to determine the clustering of the LBAs together into the one or more LBA clusters, where the machine learning circuit is located within at least one of the host device 1202 and an external server.

Additional Aspects

The subject matter described herein can be implemented in any suitable NAND flash memory, including 2D or 3D NAND flash memory. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magneto-resistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) that extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that the subject matter described herein is not limited to the two dimensional and three dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented, or a method may be practiced using any number of the aspects set forth herein. In addition, such an apparatus may be implemented, or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC) Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, the term "deriving" encompasses a wide variety of actions. For example, "deriving" may include calculating, computing, processing, determining, investigating, looking up (e.g., looking up in a table, a database or another data structure), ascertaining, and the like. Also, "deriving" may include receiving (e.g., receiving information), accessing (e.g., accessing data in a memory), and the like. Also, "deriving" may include resolving, selecting, choosing, establishing, and the like.

What is claimed is:

1. A data storage device comprising:
    a hint derivation circuit configured to derive a dataset of features for each of a plurality of logical block addresses (LBAs) of the data storage device, wherein the dataset of features comprises a first hint based on information received from a host device and at least one second hint based on a plurality of physical characteristics of the data storage device comprising at least one of invalidation times, program-erase cycle (PEC) counter values of available mapped physical block addresses (PBAs), a cell voltage distribution (CVD) read threshold, a bit error rate, and a temperature of a block being written to;
    a machine learning circuit configured to group a plurality of LBAs into one or more clusters of LBAs based on the derived datasets of features and a machine learning process applied to the plurality of physical characteristics of the data storage device; and
    a flash translation layer (FTL) circuit configured to allocate available physical block addresses (PBAs) in the data storage device to one or more LBAs of the plurality of LBAs based on the one or more clusters of LBAs;
    wherein the FTL circuit is configured to allocate the available PBAs to the one or more LBAs by being further configured to determine whether to allocate the PBAs to the one or more LBAs based on an existing PBA classification or to determine a new PBA classification and allocate the PBAs to the one or more LBAs based on the new PBA classification; and
    wherein the machine learning circuit is configured to execute a machine-learned process that comprises a dimension reduction process configured to project at least two of the plurality of physical characteristics to a lower dimension.

2. The data storage device of claim 1, wherein the hint derivation circuit is further configured to derive at least one second hint corresponding to a hint that the one or more LBAs refer to a common user file stored in the data storage device.

3. The data storage device of claim 1, wherein the dimension reduction process comprises one or more of non-negative matrix factorization (NFM), principal component analysis (PCA), kernel PCA, linear discriminant analysis (LDA), generalized discriminant analysis (GDA), and/or auto encoding.

4. The data storage device of claim 1, wherein the machine learning circuit is configured to perform the dimension reduction process based on a principal component analysis comprising:
    calculating a symmetric covariance matrix based on the plurality of physical characteristics;
    determining a plurality of eigenvectors and associated eigenvalues based on diagonalization of the symmetric covariance matrix;
    selecting at least two dominant eigenvectors, the at least two dominant eigenvectors having the largest and next largest eigenvalues among the plurality of eigenvectors; and
    projecting groupings of the LBAs to a lower dimensional representation based on the dominant eigenvectors.

5. A data storage device comprising:
    an interface circuit configured to receive read and write requests in the data storage device from a host device; and
    controller circuitry configured to:
        derive a dataset of features for each of a plurality of logical block addresses (LBAs) of the data storage device, wherein the dataset of features comprises a first hint based on information received from a host device and at least one second hint based on a plurality of physical characteristics of the data storage device comprising at least one of invalidation times, program-erase cycle (PEC) counter values of available mapped physical block addresses (PBAs), a cell voltage distribution (CVD) read threshold, a bit error rate, and a temperature of a block being written to; and
        cluster a plurality of LBAs together into at least one LBA cluster based on the derived datasets of features and a statistical analysis of the plurality of physical characteristics of the data storage device;
        wherein the controller circuitry is further configured to assign available physical block addresses (PBAs) in the data storage device to at least one of the plurality of LBAs based on the at least one LBA cluster including determining whether to assign the PBAs to the LBAs based on an existing PBA classification or to determine a new PBA classification and assign the PBAs to the LBAs based on the new PBA classification; and
        wherein the statistical analysis comprises a dimension reduction process configured to project the plurality of physical characteristics to a lower dimension.

6. The data storage device of claim 5, wherein the controller circuitry is further configured to derive at least one second hint corresponding to a hint that the at least of the plurality of logical block addresses (LBAs) refer to a common user file stored on the data storage device.

7. The data storage device of claim 5, wherein the controller circuitry is configured to cluster the one or more LBAs into one or more clusters of LBAs using one of k-means clustering, a hidden Markov model (HMM), a Gaussian mixture models (GMM), a neural network model, or a random decision forest.

8. The data storage device of claim 5, wherein the controller circuitry is further configured to:
assign available physical block addresses (PBAs) in the data storage device to at least one of the one or more logical block addresses (LBAs) based on the at least one LBA cluster;
group a plurality of the available physical block addresses (PBAs) into one or more clusters of PBAs according to one or more of physical block program-erase cycles (PECs), read thresholds, bit error rates, and/or a written temperature of a block; and
allocate free blocks from the one or more PBA clusters to one of the one or more LBAs or the LBA clusters.

9. A method comprising:
deriving a dataset of features for each of a plurality of logical block addresses (LBAs) of a non-volatile memory (NVM) storage device, wherein the dataset of features comprises a first hint based on information received from a host device and a second hint based on a plurality of physical characteristics of the NVM storage device comprising at least one of invalidation times, program-erase cycle (PEC) counter values of available mapped physical block addresses (PBAs), a cell voltage distribution (CVD) read threshold, a bit error rate, and a temperature of a block being written to;
grouping a plurality of LBAs into one or more clusters based on the derived datasets of features and a statistical analysis of the plurality of physical characteristics of the NVM storage device, wherein the statistical analysis comprises a dimension reduction process configured to project the plurality of physical characteristics to a lower dimension; and
allocating available physical block addresses (PBAs) in the NVM storage device to at least one of the plurality of LBAs based on the one or more clusters of LBAs;
wherein allocating the available PBAs to the one or more LBAs includes determining whether to allocate the PBAs to the one or more LBAs based on an existing PBA classification or to determine a new PBA classification and allocate the PBAs to the one or more LBAs based on the new PBA classification.

10. The method of claim 9, wherein the second hint is based on a plurality of physical characteristics comprising LBA ranges, invalidation times, LBA types according to associated metadata, read access frequency of the LBAs, program-erase cycle (PEC) counter values of mapped physical block addresses (PBAs), a cell voltage distribution (CVD) read threshold, an average bit error rate, and the temperature of blocks being written to.

11. The method of claim 9, further comprising:
grouping the available physical block addresses (PBAs) of a block in the NVM storage device into one or more clusters of PBAs according to one or more of physical block program-erase cycles (PECs), read thresholds, bit error rates, and/or a written temperature of the block; and
allocating free blocks from the one or more PBA clusters to one of the one or more LBAs or the LBA clusters.

12. The method of claim 9, further comprising:
linking particular LBAs of the one or more LBAs being allocated to metablocks comprising a group of blocks having complementary addresses according to at least one of the LBA clusters.

13. The method of claim 9, wherein grouping the one or more LBAs together into one or more clusters of LBAs based on the derived datasets of features and the statistical analysis of the plurality of physical characteristics of the NVM storage device includes classifying a received LBA from a host based on previously determined clusters of LBAs to determine which cluster of LBAs the received LBA should be grouped within.

14. The method of claim 9, further comprising deriving at least one second hint corresponding to a hint that the one or more LBAs refer to a common user file stored in the NVM storage device based on the plurality of physical characteristics of the NVM storage device.

15. The method of claim 14, wherein deriving the hint that the one or more LBAs refer to the common user file in the storage device provides at least one hint that a plurality of the LBAs have been either invalidated or relocated together.

16. A data storage device comprising:
means for determining a dataset of features for each of a plurality of logical block addresses (LBAs) in the data storage device, wherein the dataset of features comprises a first hint based on information received from a host device and a second hint based on a plurality of physical characteristics of the data storage device comprising at least one of invalidation times, program-erase cycle (PEC) counter values of available mapped physical block addresses (PBAs), a cell voltage distribution (CVD) read threshold, a bit error rate, and a temperature of a block being written to, wherein the second hint includes a hint that a plurality of the LBAs have been either invalidated or relocated together;
means for clustering a plurality of LBAs into one or more clusters of LBAs based on the hint and a dimension reduction analysis of one or more process of at least two of the plurality of physical characteristics of the data storage device, wherein the dimension reduction process is configured to project at least two of the plurality of physical characteristics to a lower dimension; and
means for assigning available physical block addresses (PBAs) in the data storage device to at least one of the plurality of LBAs based on the one or more clusters of LBAs;
wherein the means for assigning available PBAs to at least one of the plurality of LBAs includes means for determining whether to allocate the PBAs to the plurality of LBAs based on an existing PBA classification or to determine a new PBA classification and allocate the PBAs to the plurality of LBAs based on the new PBA classification.

* * * * *